United States Patent
Finzel et al.

(10) Patent No.: US 6,866,448 B2
(45) Date of Patent: Mar. 15, 2005

(54) FIBER OPTIC INSTALLATION

(75) Inventors: Lothar Finzel, Unterschleissheim (DE); Dieter Kunze, Neuried (DE); Günter Zeidler, Germering (DE); Rainer Kossat, Aschau (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/051,597

(22) Filed: Jan. 18, 2002

(65) Prior Publication Data

US 2002/0061231 A1 May 23, 2002

Related U.S. Application Data

(63) Continuation of application No. 09/068,286, filed as application No. PCT/DE96/02154 on Nov. 12, 1996, now Pat. No. 6,371,691.

(30) Foreign Application Priority Data

| Nov. 13, 1995 | (DE) | 195 42 231 |
|---|---|---|
| Mar. 28, 1996 | (DE) | 196 12 457 |
| Apr. 25, 1996 | (DE) | 195 16 596 |
| Apr. 25, 1996 | (DE) | 196 16 595 |
| Apr. 25, 1996 | (DE) | 196 16 598 |
| Jun. 12, 1996 | (DE) | 196 23 483 |
| Aug. 19, 1996 | (DE) | 196 33 366 |
| Sep. 30, 1996 | (DE) | 196 40 290 |

(51) Int. Cl.⁷ .......................... F16L 57/00; F16L 1/11; F16L 1/028
(52) U.S. Cl. ................ 405/157; 138/105; 405/154.1
(58) Field of Search ................. 405/154.1, 155, 405/156, 157, 174, 183; 138/105–107

(56) References Cited

U.S. PATENT DOCUMENTS

| 3,219,368 A | * | 11/1965 | Crumpler | 405/47 |
|---|---|---|---|---|
| 3,702,062 A | | 11/1972 | Olson | 405/182 |
| 3,722,225 A | | 3/1973 | Empson | 405/157 |
| 3,757,529 A | | 9/1973 | Kaercher, Jr. | 405/176 |
| 3,952,532 A | | 4/1976 | Spearman | 405/164 |
| 4,006,315 A | * | 2/1977 | Halstead | 455/41 |
| 4,063,429 A | | 12/1977 | Wilson | 405/157 |
| 4,239,336 A | | 12/1980 | Parfree et al. | 385/101 |
| 4,395,834 A | | 8/1983 | Davison | |
| 4,437,789 A | * | 3/1984 | Kasiewicz | 405/156 |
| 4,464,082 A | | 8/1984 | Isaacs | 405/157 |
| 4,785,559 A | | 11/1988 | Hentschel | 37/94 |
| 4,812,078 A | * | 3/1989 | Rivard | 405/174 |
| 4,892,442 A | * | 1/1990 | Shoffner | 405/183.5 |
| 4,896,997 A | * | 1/1990 | Gaylin | 405/157 |
| 5,006,806 A | | 4/1991 | Rippingale et al. | 324/326 |
| 5,017,873 A | | 5/1991 | Rippingale et al. | 324/326 |
| 5,122,750 A | | 6/1992 | Rippingale et al. | 324/326 |
| 5,281,054 A | * | 1/1994 | O'Riordan | 405/182 |
| 5,467,420 A | | 11/1995 | Rohrmann et al. | 385/101 |

FOREIGN PATENT DOCUMENTS

| DE | 7606741 | * | 9/1976 | |
|---|---|---|---|---|
| DE | 2735079 A1 | | 3/1978 | G02B/5/14 |
| DE | 28 51 955 C2 | | 6/1979 | |
| DE | 3001226 A1 | | 8/1980 | H02G/9/00 |
| DE | 8422532.7 | | 1/1985 | H02G/1/08 |

(List continued on next page.)

*Primary Examiner*—Robert E. Pezzuto
*Assistant Examiner*—Tara L. Mayo

(57) ABSTRACT

The invention relates to a process for introducing an optical cable, in the form of a microcable or minicable (1), in solid ground (17) with the aid of a laying unit (23). The microcable or minicable (1) used for this purpose comprises a homogeneous and pressurized-water-tight tube (8) which has an external diameter of from 2.0 to 10 mm and into which optical waveguides (3) are introduced.

48 Claims, 32 Drawing Sheets

FOREIGN PATENT DOCUMENTS

| | | | | |
|---|---|---|---|---|
| DE | 3710038 A1 | 10/1988 | ............ | E01C/23/09 |
| DE | 40 23 762 A1 | 7/1990 | | |
| DE | 4115907 A1 | 11/1992 | ............ | H02G/1/06 |
| DE | 4203718 A1 | 8/1993 | ............ | H02G/9/06 |
| DE | 196 01 576 A1 | 7/1997 | | |
| DE | 196 23 482 A1 | 12/1997 | | |
| EP | 0553991 A1 | 8/1993 | ............ | G02B/6/44 |
| EP | 0 419 637 B1 | 11/1994 | | |
| FR | 2677137 | 12/1992 | ............ | G02B/6/40 |
| GB | 2003635 A | 3/1979 | ............ | E01F/11/00 |
| JP | 57195206 A | 11/1982 | ............ | G02B/5/16 |
| JP | 60014208 A | 1/1985 | ............ | G02B/6/44 |
| JP | 61107306 A | 5/1986 | ............ | G02B/6/44 |
| JP | 03102231 A | 4/1991 | ............ | G01K/11/12 |
| JP | 06109931 A | 4/1994 | ............ | G02B/6/00 |
| JP | 06237106 A | 8/1994 | ............ | H01P/11/00 |
| JP | 08103012 A | 4/1996 | ............ | H02G/1/08 |
| JP | 08136780 | 5/1996 | | |
| JP | 08136780 A | 6/1996 | ............ | G02B/6/46 |
| WO | WO90/10879 | 9/1990 | ............ | G01V/3/08 |
| WO | WO91/12119 | 8/1991 | ............ | B29B/47/06 |
| WO | WO92/13227 | 8/1992 | ............ | F16L/51/00 |

* cited by examiner

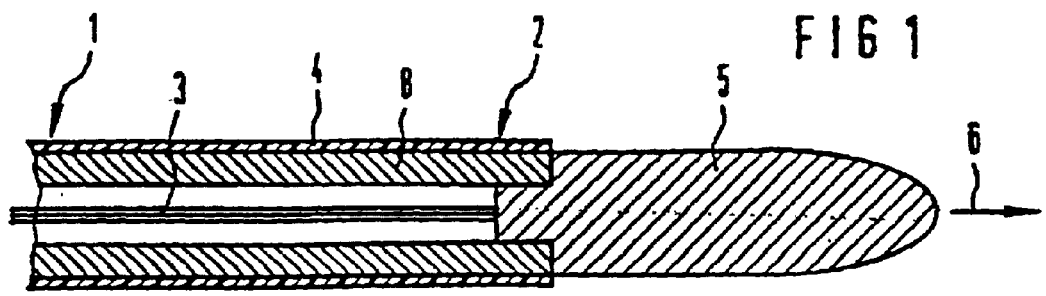
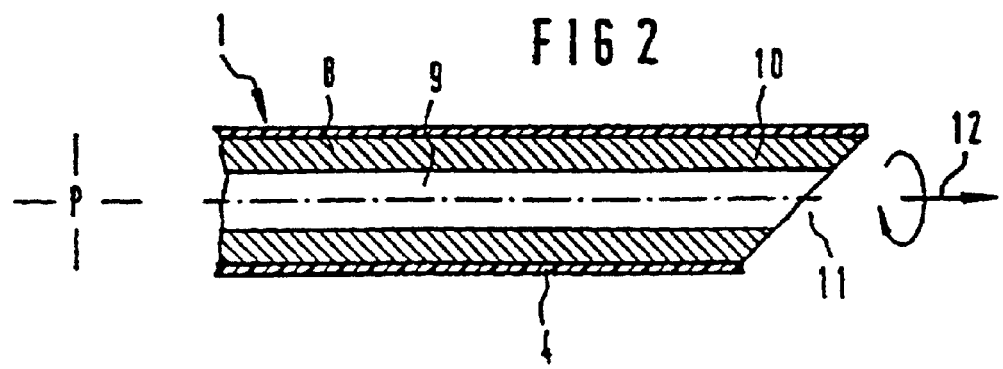
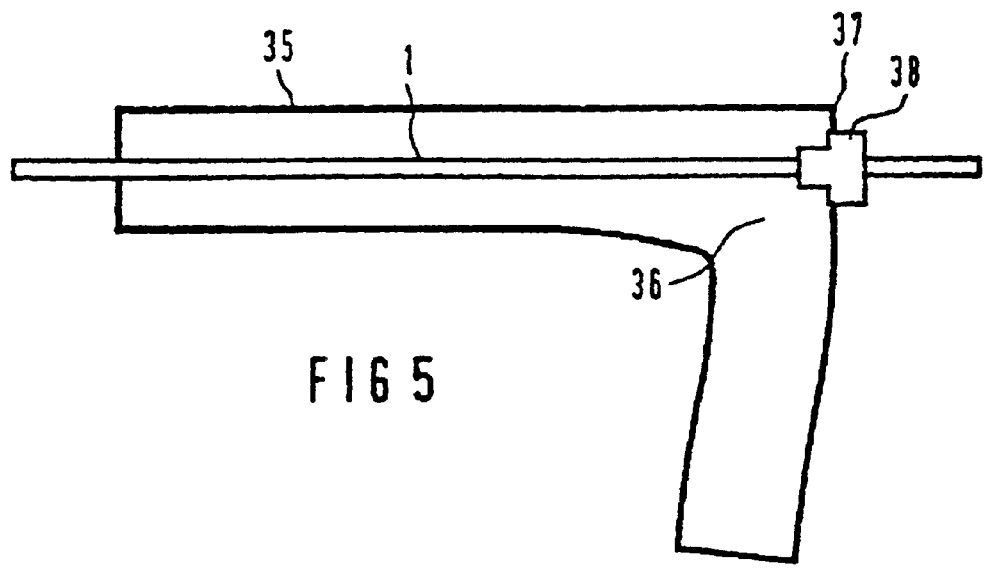

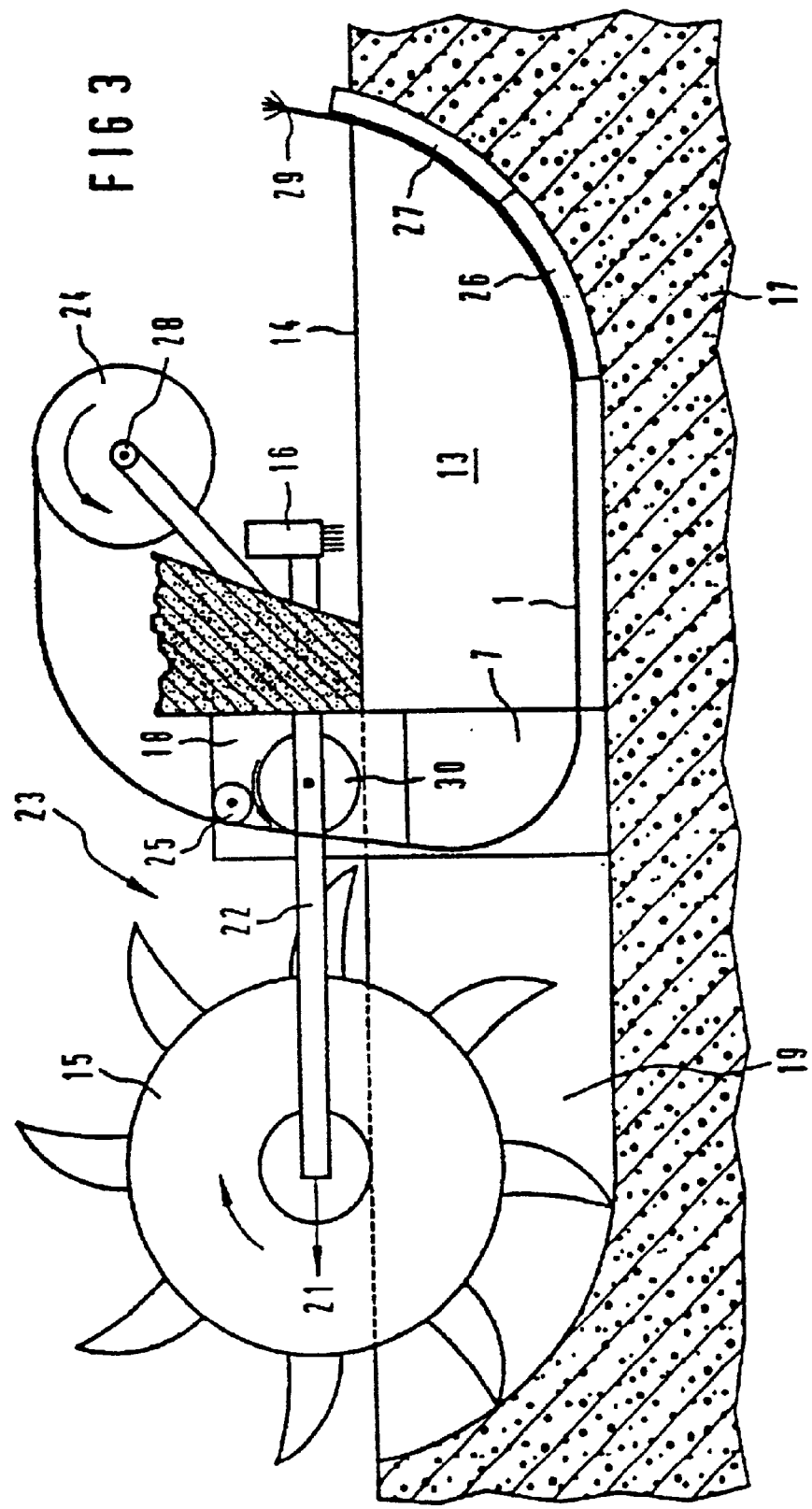

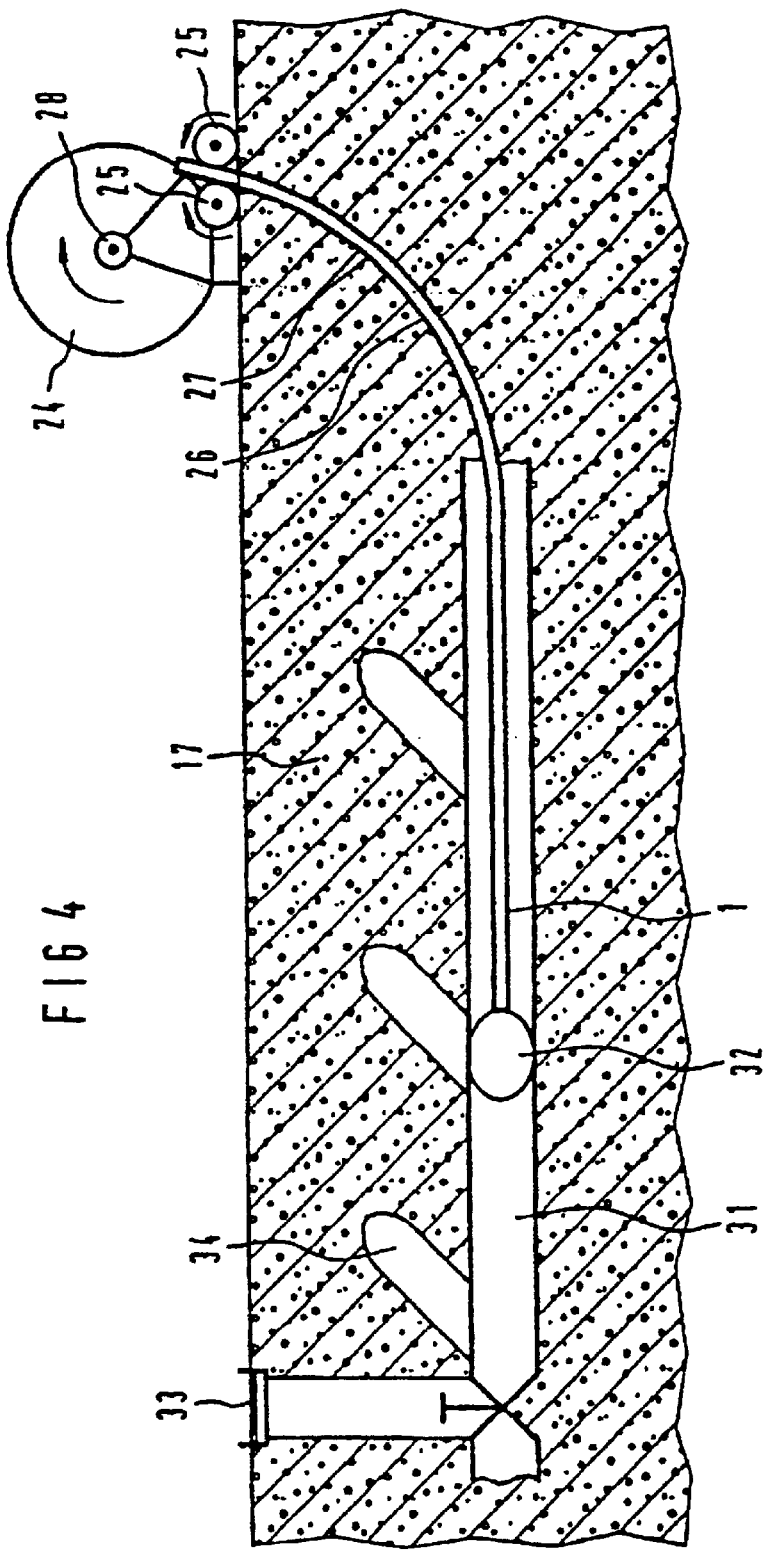

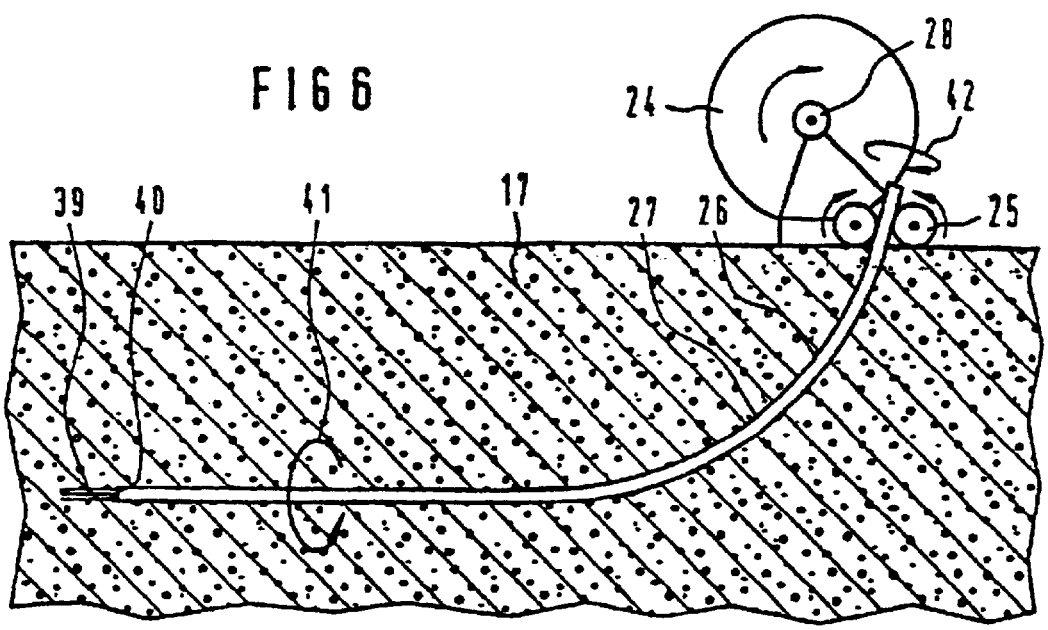
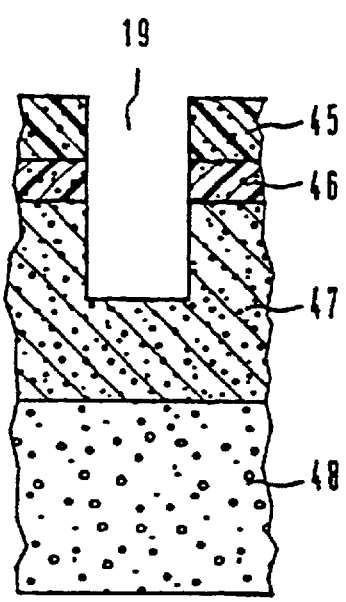
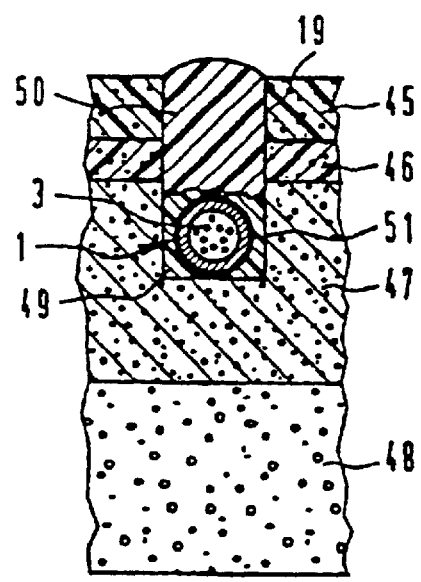

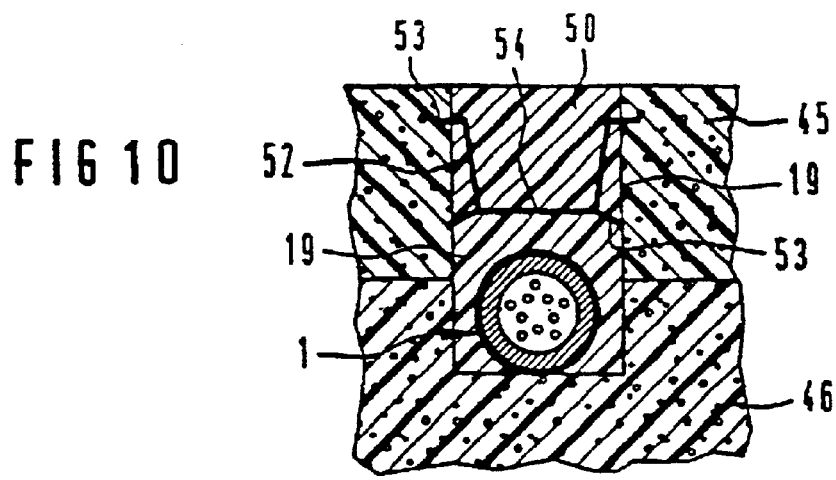
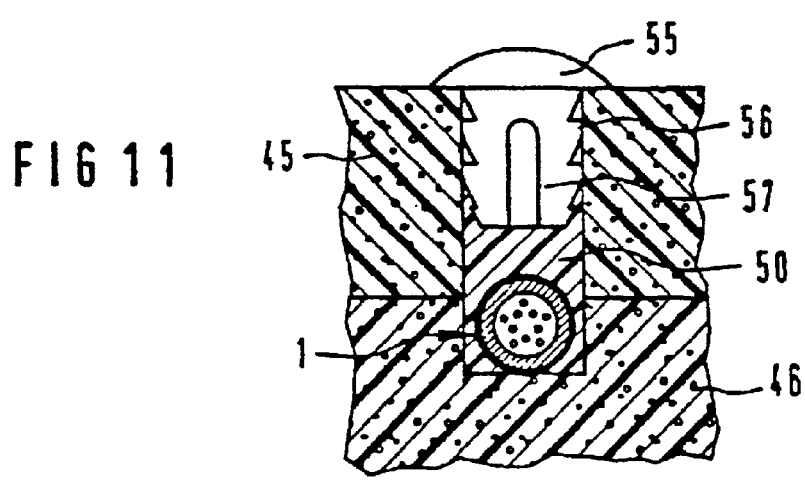
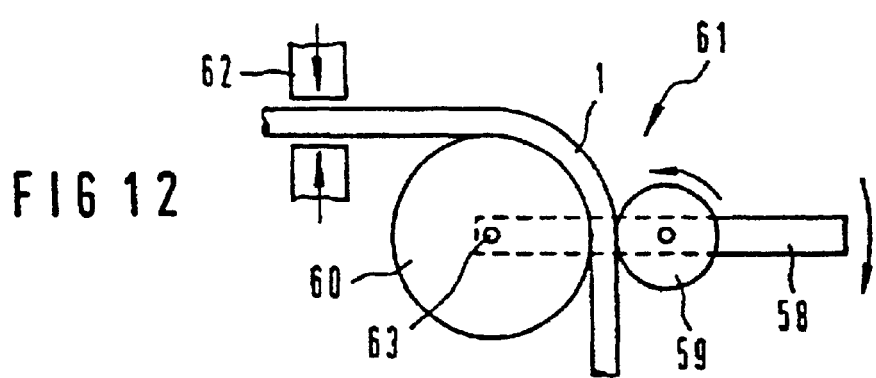

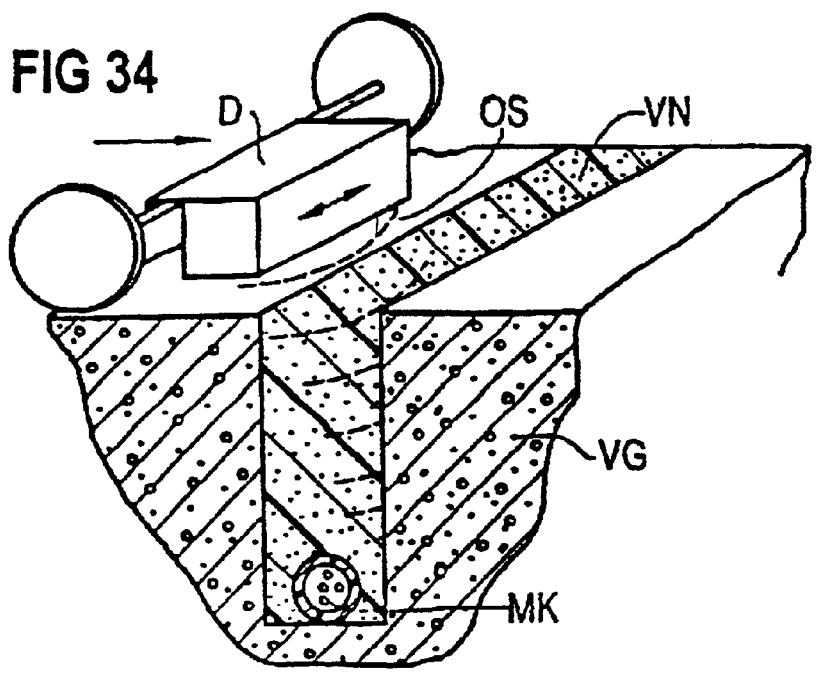
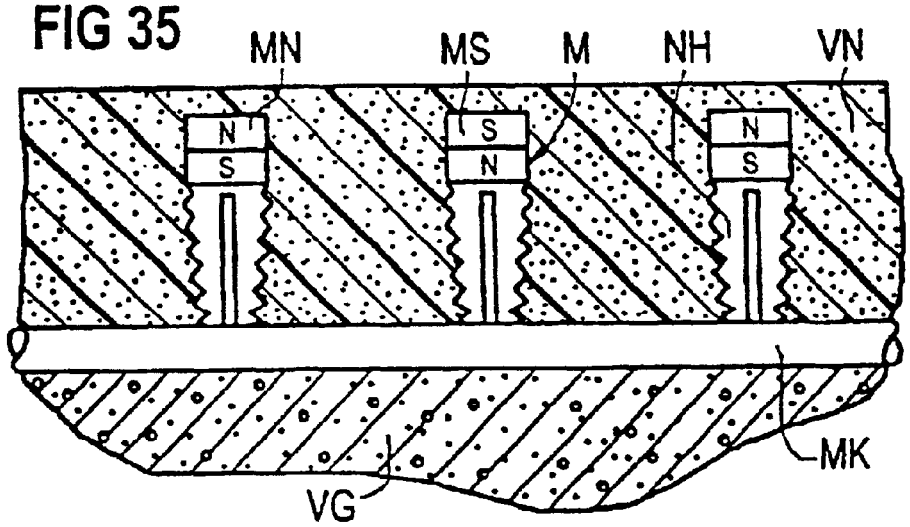

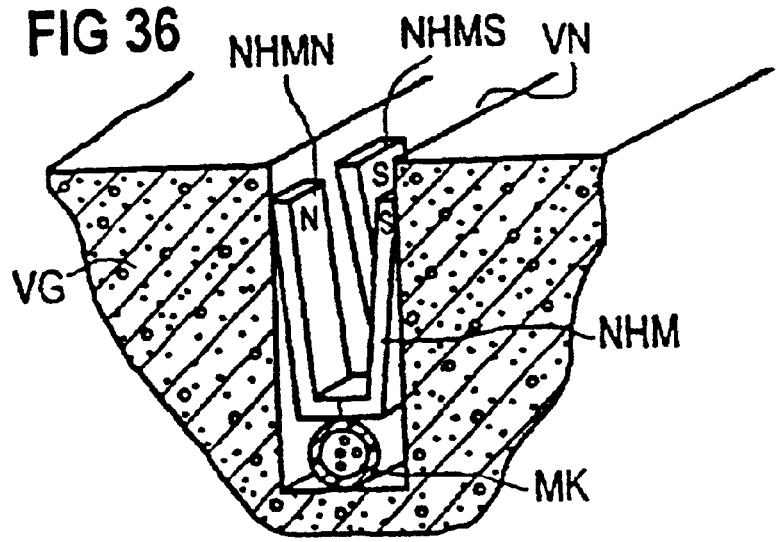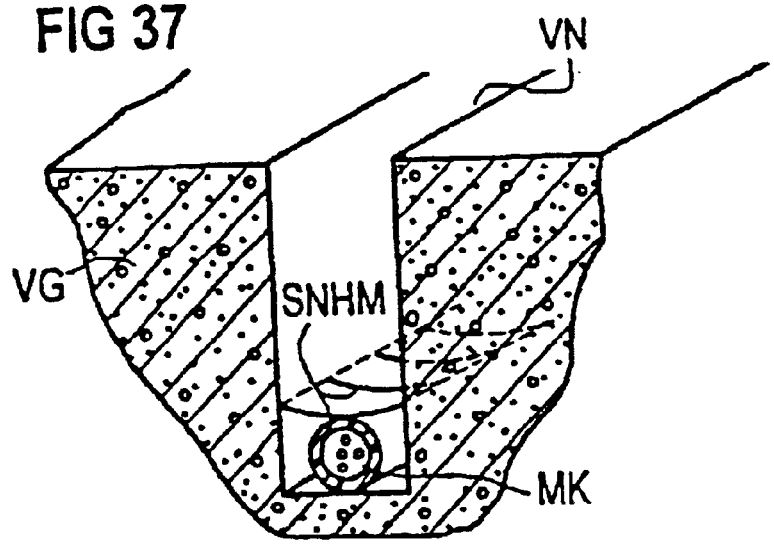

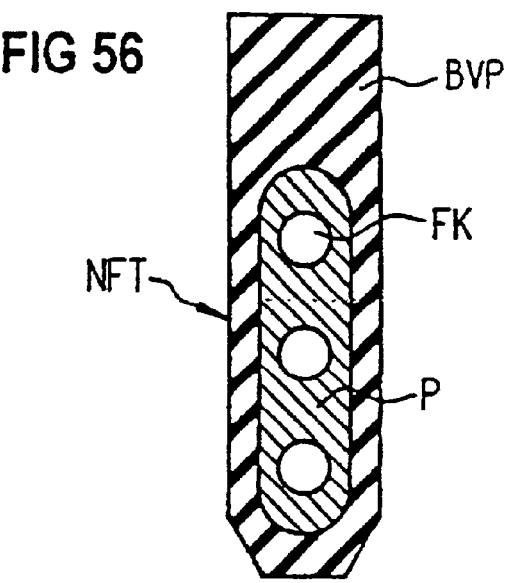
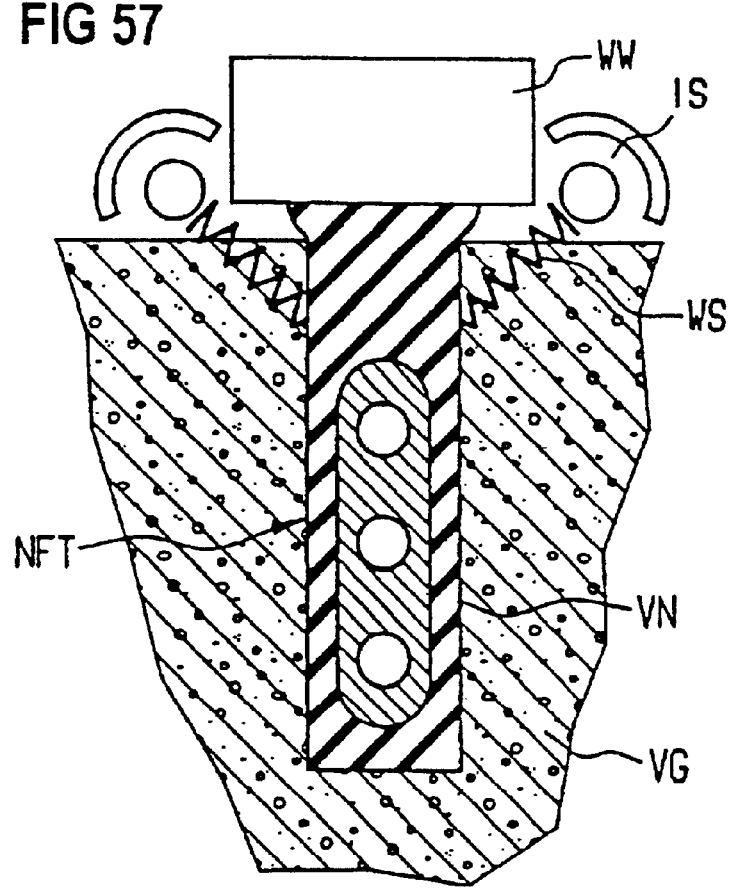

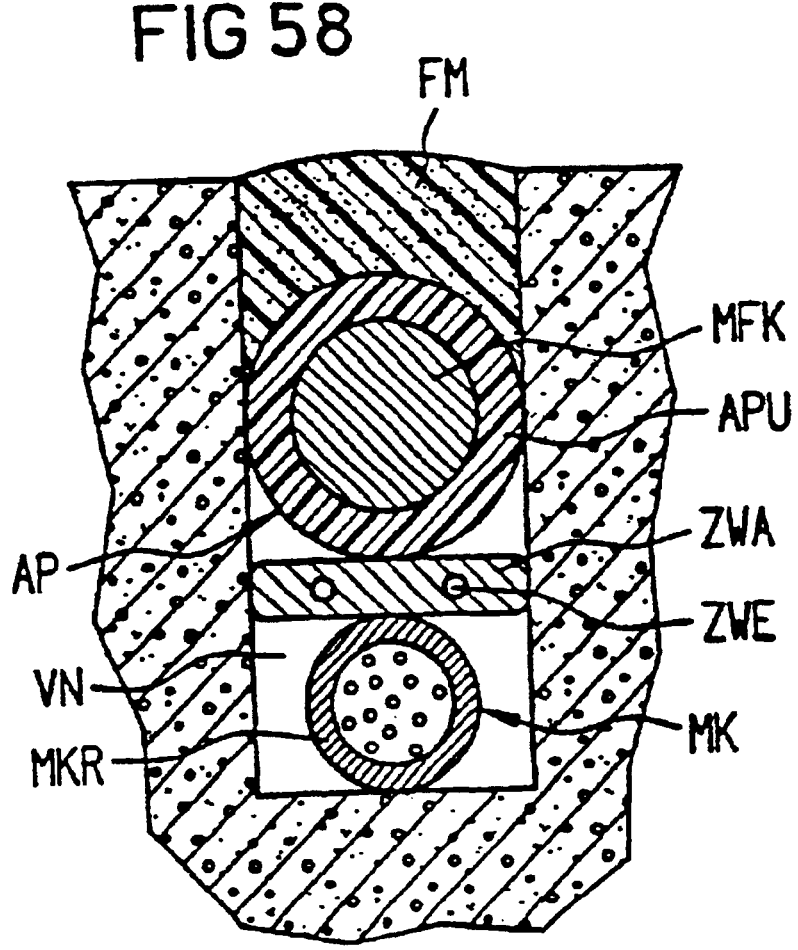

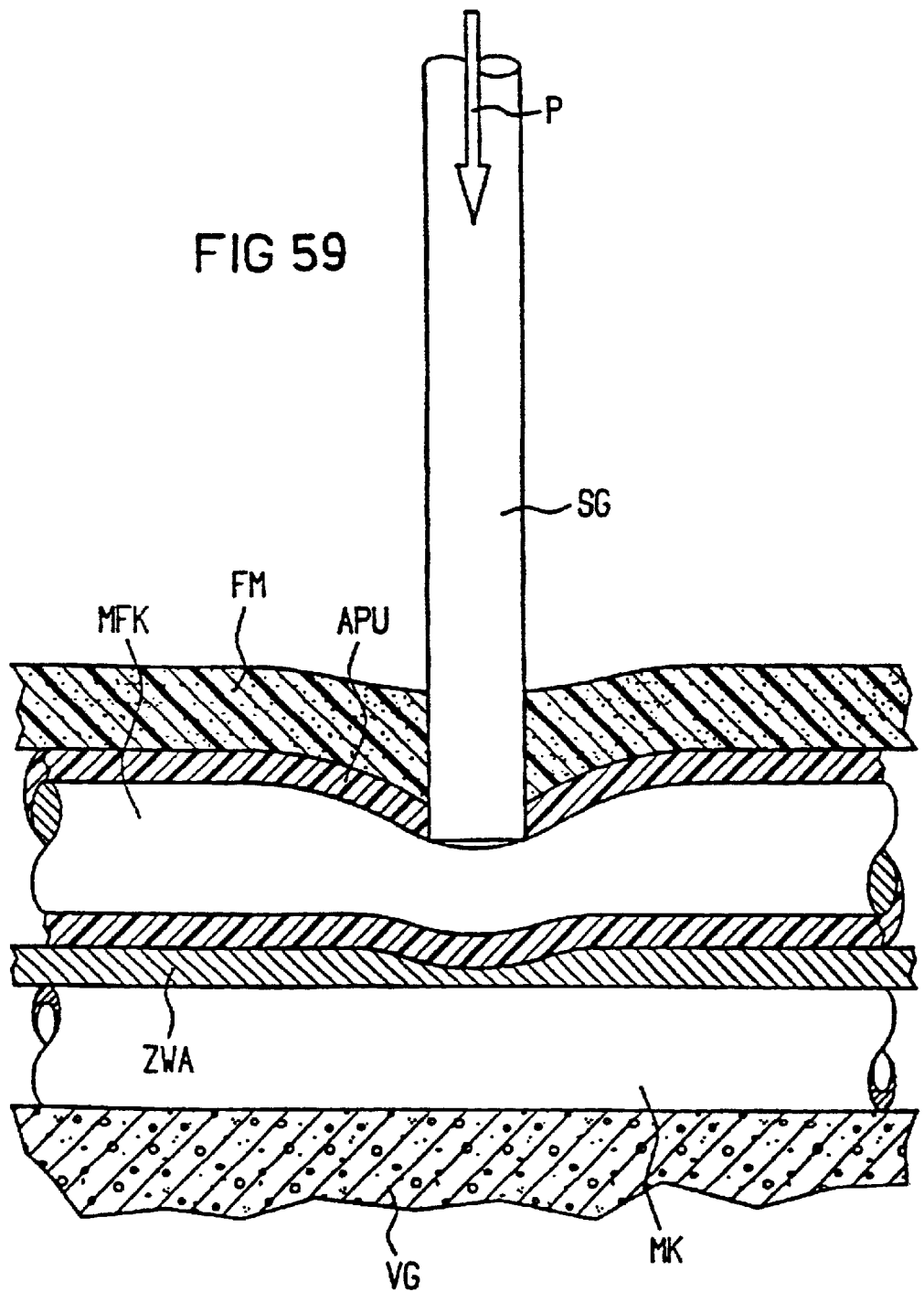

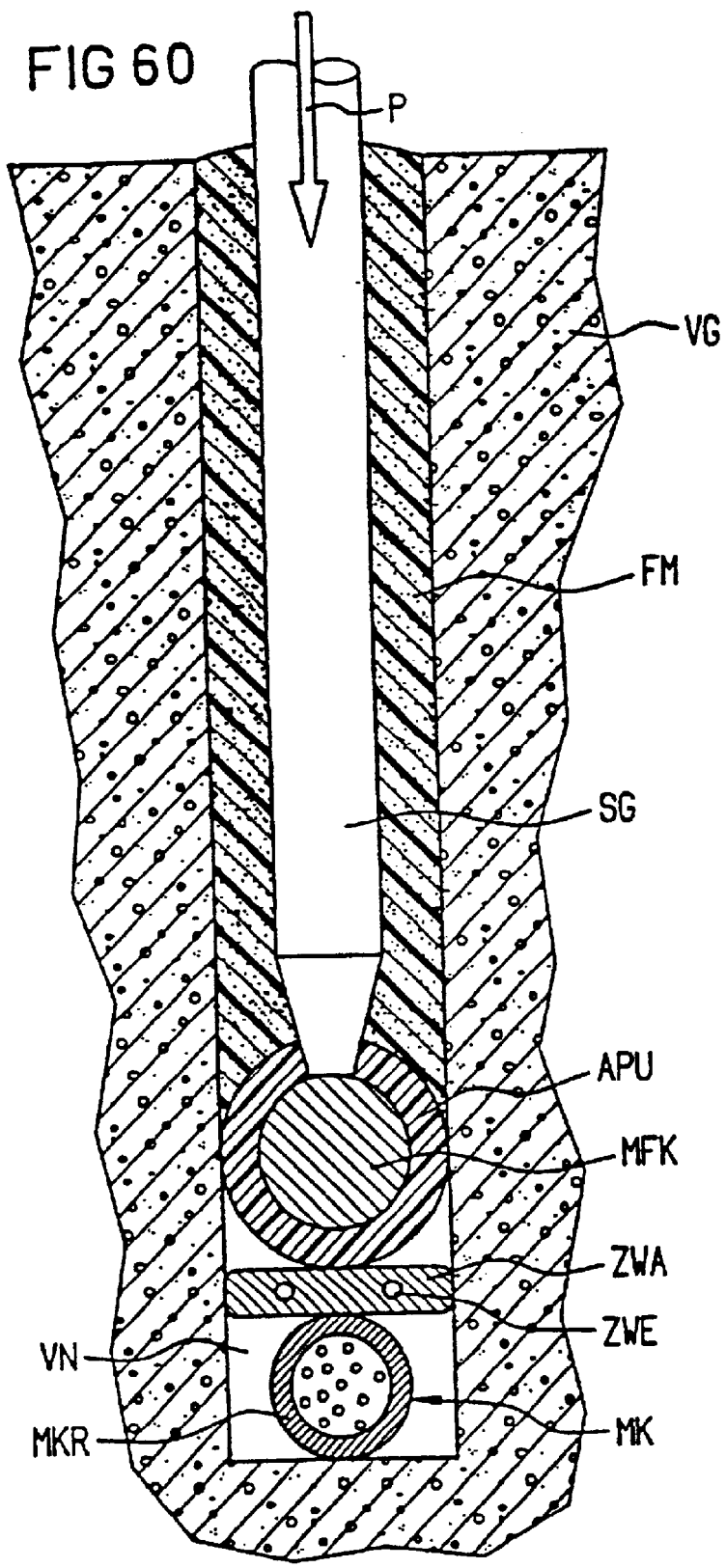

FIBER OPTIC INSTALLATION

CROSS-REFERENCE TO RELATED APPLICATIONS

This application is a continuation of U.S. application Ser. No. 09/068,286, filed May 6, 1998, now U.S. Pat. No. 6,371,691, which is a 371 of PCT/DE96/02154 filed Nov. 12, 1996 which is hereby incorporated herein in its entirety by reference.

FIELD OF THE INVENTION

The invention relates to a process for introducing an optical cable, consisting of a tube and optical waveguides introduced therein, into solid ground with the aid of a laying unit.

BACKGROUND OF THE INVENTION

DE-A1-41 15 907 discloses a cable-laying plough for laying cables in the ground, in particular in the ground under water. In this case, the blade of the cable-laying plough has arranged in front of it a rotating cutting wheel which, in addition, is made to vibrate vertically, with the result that hard objects located in the region of the trench which is to be excavated may thus also be broken up thereby. This cable-laying plough excavates relatively wide trenches by displacing the soil with the aid of the plough blade. Such machines are used, in particular, in coastal areas and under water using corresponding control devices. For laying operations in the ground, the material is usually removed over a width of from 60 to 100 cm and a cable-laying depth of approximately 70 cm, with the result that the outlay for the laying operation is relatively high.

Furthermore, DE-A1-30 01 226 discloses a line network for transmitting signals, the signals being passed through fibre-optic cables which are laid in a network of pipes or ducts of an existing supply system. In this case, however, fixed cable-laying routes are predetermined, and inlets and outlets for the cable which is to be laid have to be provided in a suitable manner therein.

SUMMARY OF THE INVENTION

Alternatively to this, use may also be made, over short distances, of so-called drilling or jetting processes in which a tube is introduced horizontally into the ground. The high outlay for laying machines and material is also disadvantageous here.

JP-A-61 107 306 discloses an optical waveguide which is provided with a metal tube in order to increase tensile strength. The optical waveguide is provided with a sheath of vinyl, nylon or urethane, these materials having elastic properties and thus protecting the optical waveguide mechanically against external influences. In order to increase the tensile strength, a metallic tube is also applied, loosely at first. Then the tubes are stretched and thus secured to the sheathed optical waveguide.

FR-A-2 677 137 discloses a repair method for optical cables which are composed of a tube and optical waveguides running therein. At the defective point, an adapted tubular element is inserted, to which the ends of the defective tube are connected again, the defective point being bypassed.

EP-A-0 553 1991-A discloses a repair method for conventional optical cables, two cable sleeves being used in which the connections are made between the optical waveguides by means of an intermediate cable element.

The object of the present invention is to provide a process for introducing an optical cable in which the outlay for the laying operation can be reduced, it also being intended that the outlay for the optical cable system used be coordinated with the laying method. The set object is achieved according to the invention, by a first process of the type explained in the introduction, in that the optical cable used is a microcable or minicable having an external diameter of the tube of 2.0 to 10 mm, preferably 3.5 to 5.5 mm, the tube being homogeneous and pressurized-water-tight, a laying channel with a width of 4.5 to 12 mm, preferably 7 mm, which is adapted to the diameter of the microcable or minicable, being introduced with the laying unit into the solid underlying laying surface, the microcable or minicable being introduced into the laying channel by means of a feed element and being held at a constant laying depth, the laying channel being filled with filling material using a filling device which is moved along after the insertion of the microcable or minicable.

The object which has been set is thus achieved in accordance with the invention planning to a second method of the type mentioned at the beginning in such a way that a microcable or minicable with an external diameter of the tube of 2.0 to 10 mm, preferably 3.5 to 5.5 mm is pressed into utility lines for sewerage, gas or water, which have been left open, using a laying unit.

The object which has been set is achieved according to the invention using a third method of the type mentioned at the beginning in that the optical cable used is a microcable or minicable with a diameter of the tube of 2.0 to 10 mm, preferably 3.5 to 5.5 mm, which is inserted into existing, active utility lines for sewerage gas or water using a laying unit.

A great advantage of the process according to the invention is that only a relatively short amount of time is taken for the laying operation, with the result that it is used particularly wherever long-term hold-ups are undesirable. This is the case, for example particularly when laying new or additional cables, when the laying operation has to be carried out in urban areas with heavy traffic. Blocking off or diverting is to be avoided as far as possible. The operations of cutting, laying and sealing the channel can take place directly one after the other, these operations expediently being carried out all in one go by a multipurpose machine. In this manner, the traffic disruption is barely greater than that caused by a road sweeper. There is also such a need, for example, when all the laid pipes, cable ducts or pipelines have already had cables laid in them, it then being possible to splice onto the newly laid cables without interruption. Tubular mini communication cables, which are referred to as microcables or minicables, are particularly suitable for this purpose. These newly laid minicables or microcables may preferably be connected to form a redundant overlay network.

According to the invention, such a minicable or microcable comprises a homogeneous and pressurized-water-tight tube of very small diameter of from 2.0 to 10 mm, preferably 2.2 to 5.5 mm. These tubes have a wall thickness of from 0.2 to 0.4 mm. The most favourable values as regards the buckling resistance are achieved with a wall thickness to an external diameter ratio of between 1/5 and 1/20, preferably approximately 1/10. The smallest internal diameter of the tube used is 1.8 mm. This tube may be produced from metal, for example from chromium-nickel-molybdenum (CrNiMo188) steel, aluminium alloys, copper or copper alloys or from plastic, for example with reinforcement inserts consisting of carbon fibres, glass fibres, or a sintered carbon-fibre structure. These tubes may be extruded, welded, folded or bonded longitudinally at the overlap. The optical waveguides are then introduced into the tube either after the empty tube has been laid or at the factory. The optical waveguides can be blown in or jetted in.

The tubular minicable can be introduced into solid ground by various types of process according to the invention:

1. The laying may be carried out by means of a laying machine which has a cutting wheel, with the aid of which a narrow laying channel having a width of from 4 to 12 mm, preferably 7 mm, and a depth of from 50 to 100 mm, preferably 70 mm, is cut in the ground, in particular in an existing roadway.
2. Such a minicable may also be forced into disused supply lines (wastewater, gas, water). Disused pipelines of utility companies are particularly suitable for a laying operation. They correspond largely with the supply network planning to be set up. Even if the disused pipes are in bad condition, it is possible to introduce the thin metal tubes of the minicable since they are pressed in in the longitudinal direction and pass through obstructions such as dirt, rust and the like. The minicable does not buckle in pipes since it is supported by the disused supply line. After leaving these pipelines, the laying operation may also be continued with the aid of other laying processes.
3. It is likewise possible for a minicable to be pushed into existing, active supply lines (wastewater, water). The function of the supply lines is barely impaired to any extent at all in this case. The tubular minicable is resistant to pressurized water, wastewater and corrosion. Gnawing by rodents can be ruled out due to the large wall thickness of the metal tube. It can be assumed that the optical-waveguide network which is to be installed corresponds with the existing supply network. Earthworks may thus be reduced to a minimum. Appropriate fittings which make it possible to lift the minicable out of the supply lines are to be provided at the appropriate locations.
4. Minicables may likewise be introduced into the ground by earth-displacement or jetting processes. In this case, first of all the tube of the minicable is introduced, as a mechanical protection, into the ground. Expediently, the fibre conductors, or very thin blown fibres, are subsequently blown or jetted in. In order to minimize the friction during the blowing-in operation, the tubes, which are produced without seams and are smooth on the inside, are coated with a plastic layer, e.g. PTFE. This layer is, for example, deposited from a PTFE suspension when the metal tube is heated correspondingly. Moreover, this layer protects against corrosion and soiling of the tube interior. Earth-displacement and pressing-in operations in which a drilling head with a bevel rotates constantly are known. If the drilling head does not rotate, the drilling body is deflected in accordance with the bevel. It is thus possible to bypass obstructions. A water jet at very high pressure may, for example, force away small stones. The tube cuts or jets its way through the ground and assists the advancement of the pressing-in process. Moreover, the water pressure can move a piston in the drilling body. The thrust-like movement of the drilling head then breaks through obstructions more easily and reduces the static friction during the drawing-in operation.

By elastic expansion of the tube, the wall friction with respect to the earth can be reduced further. For this purpose, an outlet valve would have to be provided at the end of the tube.

Using the tubular minicable according to the invention, then, results in particular advantages, as follows. The laying or introduction takes place with the aid of a hollow tube, which, as cable, is already provided with optical waveguides; however, it is also possible for the optical waveguides to be drawn in subsequently. Appropriate selection of the wall thickness ensures sufficient protection against mechanical loading, corrosion and gnawing by rodents. Moreover, the tube has a high stability to transverse compressive stress. For lengthening and thinning the tube, use may be made of methods, which are known per se, with cutting clamping rings or a crimping process. For lengthening a tube consisting of copper, connection by cold pressure welding is possible, for example. Otherwise, the tube can be processed like a normal installation pipe, these methods relating to bending, provision of fittings, branchings and inlets in sleeves. Also suitable for this purpose are cylindrical metal fittings into which the minicable can be introduced tightly. When the laying operation is taking place from the surface of the ground, the surface is only minimally broken up, which is particularly advantageous for laying operations in roads. Moreover, as a result of the rigidity, pulling and pushing the minicable is possible and helpful in the laying operation. Due to the small diameter of such a minicable, the earth displacement is also particularly low, it being possible for the earth to be displaced when the cable is pressed or drawn into the surrounding earth.

A tubular microcable or minicable is particularly suitable for laying in a roadway or in footpaths since the roadway formation is barely broken up by the necessary channel. All that is necessary in order to ensure the safety of such a cable is a channel having a width of 4 to 12 mm and a depth of approximately 70 mm. In this case, the channels for receiving the cables should, as far as possible, only be provided on the sides of the road since stressing is at its lowest here. The channel which has been introduced is refilled after the introduction of the cable or of the tube and is sealed against the penetration of surface water. This sealing must not produce any cavities in which surface water can collect. The roadway surface can be restored in a simple manner. All that is required during repair work is that, when the road surface is cut away, the minicable or microcable which has already been laid is not damaged.

A laying operation using a microcable and the corresponding laying process according to the invention produces considerable reductions in the costs for the laying method, this resulting in a considerable reduction in the overall line-laying costs in the case of a new installation. Moreover, the operational reliability is increased by redundant routing. It is also advantageous that annular network structures with various connection possibilities can be formed from former rigid, star-shaped branching networks. A flexible, intelligent network design is obtained in this manner, it being possible for microcables to be switched in with the aid of optical switches. A pigtail ring with optical switching, in which optical fibres could be routed as far as the subscriber, would thus be possible. It is highly advantageous that subsequent laying operations in roads, footpaths, cycle paths, curbstones and the like are possible with a low degree of outlay. Consequently, a technical concept may be adapted in a simple manner to the wishes of the operator, it being possible to utilize the existing infrastructure (wayleaves, and pipes for wastewater, gas, district heat, etc.) It should also be noted here that, in comparison with the standard method, this method can save a large amount of time.

Various points should be noted when a laying channel is provided in an asphalt surface of a federal road which is made up of a top surface course of 4 cm, a binder course of approximately 8 cm and a base course of from 10 to 15 cm. The proportion of bitumen decreases towards the base course, but the coarse-grained fillers increase. However, the bitumen ensures the cohesion within the individual layers. During cutting as far as the asphalt base course, the laying channel is, then, dimensionally stable, with the result that no material caves in and the overall upper road structure remains intact. During cutting, it is not permitted to cut through the bitumen base course as far as the anti-frost layer of the substructure since this may result in weak points in the series of asphalt layers, which weak points could break up the layer formation and result in damage to the road within a short period of time. However, if the minicable is laid in a water-tight and frost-resistant manner, the soil mechanics are not influenced by this intervention. However, modern roads are frost-resistant since the crushed-stone substructure bears and absorbs loads. This discharges gravitational water into the earth or into drain pipes, and a sealed, intact surface course does not let in any surface water. Frost damage cannot therefore occur. This minimum laying-channel width and vibration-free cutting means that the mechanical structure of the road remains intact. Directly after the laying operation, the laying channel is closed off again in a frost-resistant manner by a hot-melting bitumen or by a fusible preformed bitumen filler.

However, very heavy traffic may result in additional consolidation and flow in the upper structure of the road (lane grooves, shoulder). It is thus recommended that the laying channel is foam-filled with a curable plastic around the minicable directly after the latter has been laid. After curing, the foam filling achieves a compressive stressability which is sufficient for further distributing the load of the carriageway surface uniformly. Cavities and interstices between the minicable and the laying channel are filled, without leaving any cavities which could receive any surface water which may penetrate and propagate this surface water along the minicable.

Vibrations due to the heavy traffic are absorbed by the foam filling and are not passed on to the minicable. Relatively small occurrences of the earth subsiding may also be compensated for by the elastic foam, with the result that such irregularities in the bitumen base course would not result in the failure of the minicable due to bending of the tube or fibre elongation.

For a minicable according to the invention, compressed-gas monitoring and monitoring with a liquid, for example, are also possible. The minicable may thus also be filled with a liquid which, in the case of the tube having a defect, escapes and resinifies under the action of air. This ensures a kind of "self-healing".

Moreover, the minicable is interception-proof since the optical waveguides cannot be bent. The minicable is stable with respect to transverse forces, has a high tensile force, is compact and, on account of the small diameter, has a relatively low weight and little friction. The tube, which acts as the cable sheath, also assumes, at the same time, the tensile-force function of the otherwise customary central element. In this high-strength cable with very low expansion, there is no problem in respect of excess lengths when the minicable is drawn in and laid. This configuration gives a higher strength in comparison with a normal cable with a conventional plastic cable sheath, with the result that it is also possible to work with considerably larger drawing-in forces. Moreover, straightforward earthing is possible in the case of the metal embodiment. If use is made of a plurality of tubes which are insulated with respect to one another, the metal cross-section may also be used for supplying power to active components. By using metal tubes, it would also be possible for overhead cables to be of a considerably more straightforward construction. A supporting element (e.g. a messenger wire) could then be dispensed with since the metal tubes assume this function. In addition, such a minicable is pressurized-water-tight, gas-tight, forms a water vapour barrier and gives protection against the gnawing of rodents. Furthermore, it is fire-resistant, has excellent heat-dissipation properties and is resistant to aging and corrosion.

The flexibility of the minicable or of the tube can be improved by a grooved sheath.

Further developments of the invention are given in subclaims.

BRIEF DESCRIPTION OF THE DRAWINGS

The invention will now be explained in more detail with reference to 57 figures.

FIG. 1 shows a construction of the tubular microcable or minicable with a capping.

FIG. 2 shows, schematically, a longitudinal section through the minitube without optical waveguides.

FIG. 3 shows, schematically, the laying operation for a minicable.

FIG. 4 shows the forcing-in process for a minicable.

FIG. 5 shows the pushing-in process for a minicable.

FIG. 6 shows the jetting process for a minitube.

FIG. 8 illustrates the cross-section of a roadsurface with a laying channel cut therein.

FIG. 9 shows the laying channel which has already been filled in.

FIG. 10 shows a U-shaped holding-down device for microcables in the laying channel.

FIG. 11 shows a rivet-like metal bolt as holding-down device for minicables.

FIG. 12 shows a plan view of the sketched construction of a bending device for thin-walled tubular microcables or minicables.

FIG. 31 shows an embodiment according to FIG. 30, but with a web consisting of insulation material located in between.

FIG. 34 shows a sketch of the process being carried out.

FIG. 35 shows the laying of the minicable or microcable with magnet-containing cable holding-down devices.

FIG. 36 shows U-shaped, magnetic cable holding-down devices in the laying channel.

FIG. 37 shows bar-like, magnetic cable holding-down devices in the laying channel.

FIG. 56 shows a profile body which is coated with a sealant.

FIG. 57 shows an exemplary embodiment for heating the sealant during the laying operation.

FIG. 58 shows the covering profile after the laying operation in the laying channel.

FIG. 59 shows a cross-section of the mechanical influence of the pointed object.

FIG. 60 shows a front view of the influence of the object on the covering profile.

DETAILED DESCRIPTION OF THE INVENTION

Figure 7:
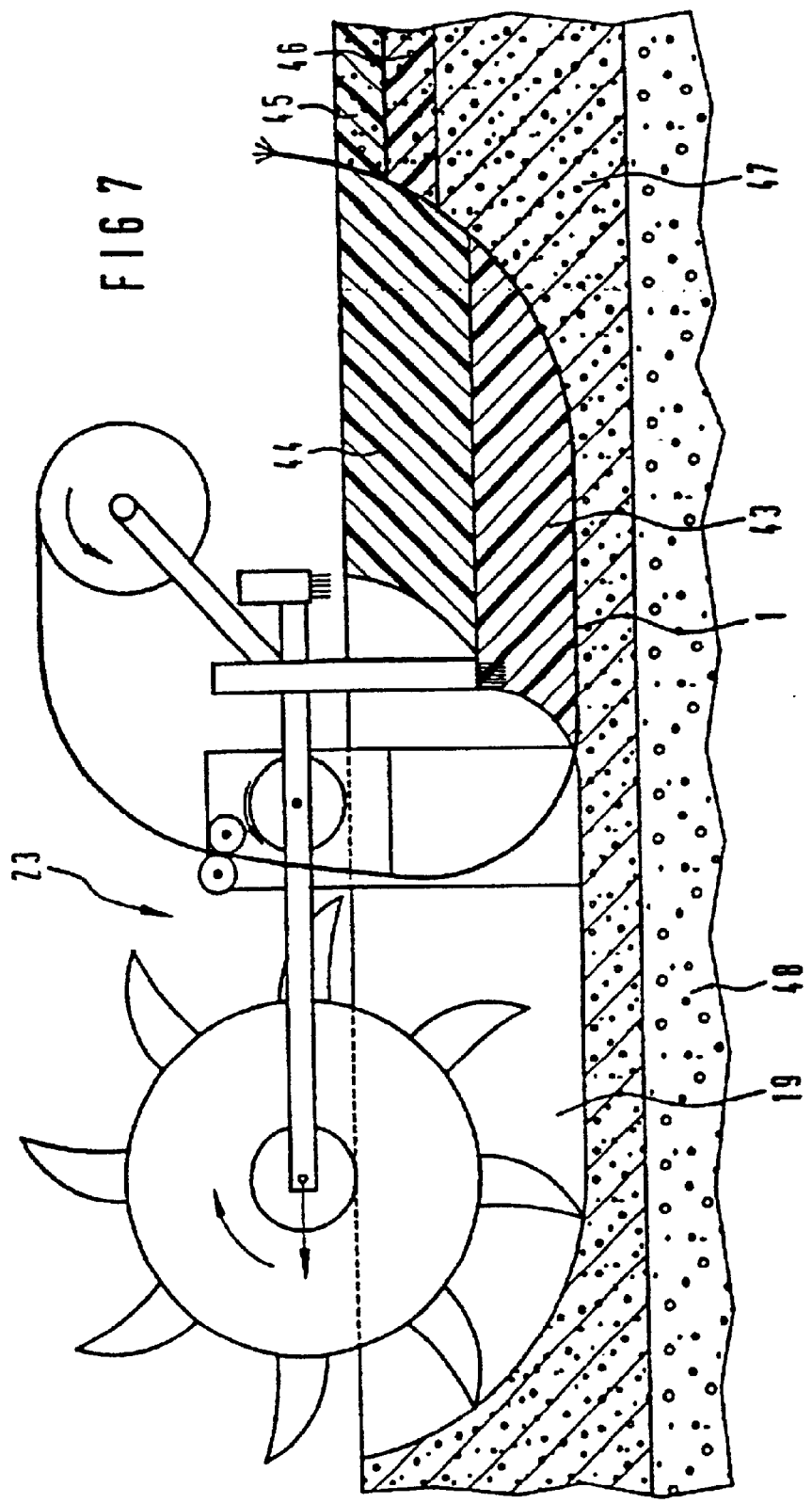
FIG. 7 shows the method of laying the tubular minicable with the laying channel already filled again.

FIG. 1 shows the construction of a tubular microcable or minicable 1, the cable end 2 being provided with a drawing-in or drilling tip 5. The arrow 6 indicates the drilling movement or advancement direction of the drilling head. Running in the interior of the minicable 1 are the optical waveguides 3, which may be introduced either at the factory or after the laying operation. The outer surface of the minicable is provided with a surface protection 4.

FIG. 2, then, shows the tube 8 of the minicable 1, in the interior of which, that is to say in the central duct of which, optical waveguides have not as yet been provided. In this case, the said central duct serves initially as a pressurized jetting duct for the laying operation. Thus, an appropriate medium, for example a suitable liquid, is injected under pressure, with the result that the earth is jetted out and displaced at the end 11 of the minicable. In addition, rotating movement of the drilling tip 10 in accordance with the arrow directions 12 can increase the action. Following the laying operation, the optical waveguides or so-called blown-fibre conductors are then introduced into the tube 8 of the minicable 1. On the left-hand side of the minicable, the letter P symbolizes the pressure, required for the jetting process, by which the medium is injected. If a valve is provided at the end of the drilling tip 11, corresponding control allows the liquid to be pulsed out under pressure. At the same time, the tube 8 could increase and decrease in diameter in an oscillating manner, this eliminating static friction with respect to the earth.

FIG. 3 displays a method of laying a tubular minicable in the sand, gravel, earth or asphalt with the aid of a laying unit 23, by means of which a laying channel 19 is cut in the surface 14 of the ground 17. Covering slabs or cobble stones are removed beforehand. The machine comprises a linkage 22 on which the required individual parts are combined to form a unit. All the process steps are coordinated with one another. In the case of the laying channel 19 which is to be provided in the laying direction 21, a cutting wheel 15 with corresponding cutting teeth, which cut a thin laying channel 19 with steep side walls, leads. The width of the laying channel is just sufficient to receive the tubular minicable 1 and the laying blade 18. Said laying blade 18 protects the side walls against caving in, guides the minicable 1 along and, via a cable-fixing means 7, holds constantly at the laying depth that end of the cable which is to be laid, the minicable or microcable 1 being fed from a ring, which is wound up on a laying reel 24, via advancement rollers 25. A jetting rod 16 compacts the deposited earth or filling sand 20 behind the laying blade 18. This operation takes place directly after the excavating operation. It is thus not possible for the side walls of the laying channel in the region 13 of the laying machine to cave in. Surrounding earth will not cave in, with the result that the surface 14 will not sink. The cutting wheel 15, the laying blade 18 and the jetting rod 16 together form the laying unit 23 and are connected rigidly to one another via a linkage 22. A drive 30 moves the entire laying unit 23 continuously in the laying direction 21. The end 29 of the minicable is introduced at the beginning of the laying channel 19 via a so-called laying bow 26 and a laying thimble 27. The central connection 28 for pressurized water jetting is provided on the laying unit 23. Following the laying operation, the road surface is restored or sealed.

Such laying operation gives particular advantages since all cable types with a small diameter can be laid, the outlay being essentially lower than for conventional laying with a wide trench. During the laying operation, the minicable is both drawn by the laying blade and guided along by the advancement rollers. Pulling and pushing of the minicable during the laying operation can reduce the tensile loading. Moreover, the tubular design of the minicable prevents buckling during laying in the channel. Excavating, laying, filling in and sealing the ground take place directly one after the other and constitute a precisely coordinated operational sequence. The cable is supported by the very narrow laying channel, with the result that the risk of buckling is reduced. Moreover, in the case of such a narrow laying channel, the soil mechanics and the surface of the ground are only minimally disturbed, so that post-treatment is not necessary. The coordinated operational sequence does not allow the side walls of the laying channel to collapse, so that the soil is also prevented from caving in afterwards. If the blown-fibre method is used for introducing the optical waveguides, one or more hollow tubes are laid, as a result of which pressurized water may then be channelled directly onto the cutting wheel. This loosens the rocks or the subsoil.

FIG. 4 illustrates the system for the forcing-in process, by means of which a minicable 1 is forced into a disused supply line 31. It is indicated that the minicable 1 which is to be forced in may, for example, also come up against accumulation of dirt 32 which constitutes blockage of the supply line. Corresponding pressure has to be used to pass through this accumulation of dirt 32. This figure further illustrates that the disused supply line 31 may have a plurality of branchings, so that it would also be possible for minicables to be introduced from there. Valve openings 33 which are originally used for the supply line and are each provided with a covering could be utilized for sleeve inserts for the newly introduced minicable system. At the start of the injection location, the minicable 1 is likewise introduced via a so-called laying bow 26 and a laying thimble 27, advancement being effected, for example, once again by means of advancement rollers 25. Here too, the minicable 1 is drawn off from a laying reel 24. It is also possible here for pressurized water to be injected, via a central connection 28 for pressurized water, to the end location of the introduced minicable 1.

FIG. 5 illustrates the introduction of a minicable 1 into an existing supply line, for example into a water pipe. At a bend 36 of the supply line 35, the minicable 1 is introduced via an outlet location 37, the inlet location being provided with a corresponding seal 38. The minicable 1 is advanced within the supply line with relative ease since there are no expected obstructions. Gas or flowing water injected into the supply line assist the advancement of the minicable.

FIG. 6 illustrates the jetting process for a minitube, which is then provided with optical waveguides in the second process step by the blown-fibre principle and thus forms the finished minicable. As has already been indicated, first of all only the empty minitube is jetted into the earth 17. In this case, pressurized water is channelled into the minitube via the central connection 28, this resulting in the formation, at the end of the drilling head 40, of a pressurized jetting cone 39 by means of which the earth 17 is jetted out. The drilling tip 40 is, in addition, made to rotate 41 in order to increase the jetting-out action. The minitube is also expediently made to rotate 42 at the inlet location. After the minitube has been laid, the optical waveguides are then jetted or blown in by the blown-fibre process. The inner wall of the tube is coated with plastic in order to improve the sliding movement of the fibre element during the blowing-in operation.

FIG. 7 illustrates the laying of a microcable in an asphalted road surface. As a supplement to laying the minicable 1 in a cut laying channel 19, the laying channel 19 is first of all partially filled with a curable filling foam 43 after the minicable 1 has been laid. Finally, above this filling foam, the laying channel 19 is filled with a water-tight closure 44, for example consisting of hot bitumen, with the result that the roadway surface is sealed off again. It can further be seen from FIG. 7 that a road structure is made up of various layers. An anti-frost layer 48, generally comprising crushed stones, has a base course 47 arranged on it. The latter is adjoined to the top by a binder course 46, which, finally, is sealed by a surface course 45. It can be gathered from this that the laying channel 19 must not cut right through the base course 47, in order that the supporting function is not impaired.

FIG. 8 illustrates the position of the laying channel 19 by a road cross-section with the above-described layer structure comprising an anti-frost layer 48, an asphalt base course 47, a binder course 46 and a surface course 45. It is only the surface course 45 and the binder course 46 which are cut through by the laying channel 19, the asphalt base course 47 only being cut to a partial extent. Depending on the nature of the road surface, the cutting depth is between 4 cm and 15 cm. A laying depth of approximately 7 cm is optimum.

FIG. 9 illustrates the same structure as in FIG. 8, but it is also shown how the laying channel 19 is filled again and closed off after the tubular minicable has been laid. It can thus be seen that the base of the channel is provided, around the minicable 1, with a curable filling foam, over which a bitumen sealing compound or a preformed bitumen joint filler is introduced in a sealed manner. It would also be possible for the filling material 49 to be applied to the microcable, as the cable sheath, at the factory. It would form an additional protection for laying the microcable. Suitable means or processes e.g. with the supply of heat, could make the filling means expand. The laying channel 19 is consequently sealed off, so that it is not possible for any surface water to penetrate. Optical waveguides 50 are indicated in the interior of the minicable 1. In order to rule out damage during laying and corrosion to the outer sheath of the metallic tube by leakage currents in the ground, the minicable 1 is provided on the outer side with a non-conductive protective layer 51 which insulates the metal with respect to the earth. A thin cable sheath of plastic can be applied as the protective layer. For this purpose, a firmly adhering wear-resistant coating may also be applied. The channel is sealed off with hot bitumen. If a preformed bitumen joint filler is used to seal the laying channel 19, then it is introduced into the laying channel 19 on edge and the surface courses to be connected are heated with a gas flame or infrared until a liquid bitumen film is obtained. A slight excess of the preformed bitumen filler is subsequently rolled into the joint and thus closes off the channel in a water-tight manner.

FIG. 10 illustrates how the laid minicable 1 is fixed by U-shaped holding-down devices 52. These U-shaped clamps 52 are pressed into the cut laying channel 19 from above. In this case, the web 54 of the clamp 52 holds down the laid microcable or minicable. Tolerances in the channel width are compensated for by the spring action of the lateral flanges.

The flange ends may be provided with lateral claws 53 so that they can engage in the side walls of the laying channel 19. If the filling compound softens, for example, due to hot temperatures, the cable holding-down devices 52 hold the microcable or minicable in position without allowing it to rise up.

FIG. 11 shows a further exemplary embodiment for cable holding-down devices 57. These comprise rivet-like metal bolts which are driven into the cut laying channel 19 by means of their resilient shank 57. The lens-shaped head 55 terminates at the roadway surface or is slightly elevated. The cable route is easy to recognize by the heads 55 of the holding-down devices. The shank of the cable holding-down device 57 is provided with barbs 56.

FIG. 12 illustrates a bending device for cable branchings and equalizing loops for thin-walled tubular microcables or minicables. In the case of very small wall thicknesses, the microcable or minicable is very sensitive to buckling. However, radii down to 30 mm can be produced without buckling by a bending device 61. For this purpose, the microcable 1 is fixed with clamping tongues 62 and drawn around a bending mandrel 60. For simple manipulation, a pressure-exerting roller 59 can draw the microcable or minicable 1 around the bending mandrel, the hand lever 58 being actuated in the arrow direction. The pivot point 63 of the hand lever is located in the axis of the bending mandrel 60.

Figure 13:
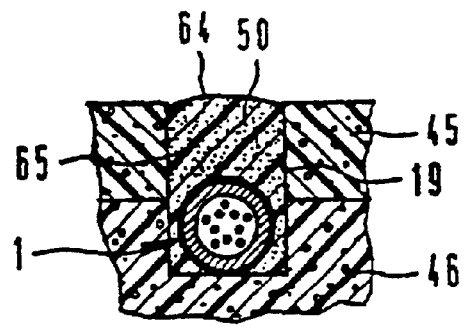
FIG. 13 shows the laying channel filled with hot bitumen and coloured glass particles.

FIG. 13 illustrates an exemplary embodiment for a marking of the microcable or minicable route. Such a marking is particularly important for locating a microcable or minicable and serves, at the same time, as a warning marking for road construction work. The cut laying channel 19 is hermetically sealed with a hot bitumen 65. In this case, the hot bitumen 65 has glass splinters 64, for example, added to it as filler, with the result that, when light shines thereon, the course of the laying channel 19 is shown up by the reflection of light. Hot bitumen usually has a very low viscosity for processing. For a laying-channel width of from 7 to 10 mm, the viscosity of the hot bitumen can be increased by aggregates. The mechanical properties of the sealing compound may then also be compared with those of the existing road surface. For the marking, use may be made of ground, coloured glass splinters as fillers and aggregates. Different colouring and reflection mean that the cable route may then be recognized clearly. Under normal wear of the roadway surface, a number of glass particles are always exposed and are thus easy to recognize.

Figure 14:
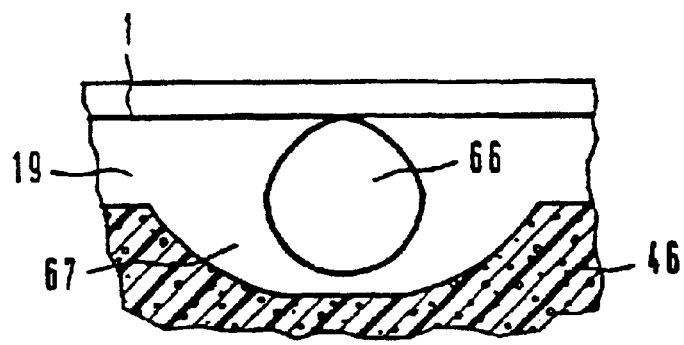
FIG. 14 shows a length-equalizing loop in a longitudinal section through the road surface along a cut laying channel.

FIG. 14 illustrates that the microcable or minicable may be provided with equalizing loops 66 for length equalization and also for cable lead-throughs at a sleeve. This means that excess lengths are taken up during laying and crimping of the tubes and that subsidence in the earth, in the road and expansions in length in the microcable or minicable and the road surface are compensated for without detrimental longitudinal stressing. Such equalizing loops 66 are to be fitted during laying, in which case the laying channel 19 has to be provided at the appropriate locations with a corresponding depression 67 or widening in order to obtain sufficient space for the equalizing loop 66. Such equalizing loops 66 are preferably to be fitted in front of sleeves, cable branches and bends. If a microcable or minicable is to be laid at right angles, then a core hole has to be introduced vertically into the upper road structure. In this case, the diameter depends on the minimum microcable or minicable radius which can be bent without buckling by means of the abovedescribed bending device. The core hole should subsequently be sealed again in a frost-resistant manner by asphalt. U-shaped bends of the minicable are also possible instead of the equalizing loops.

Figure 15:
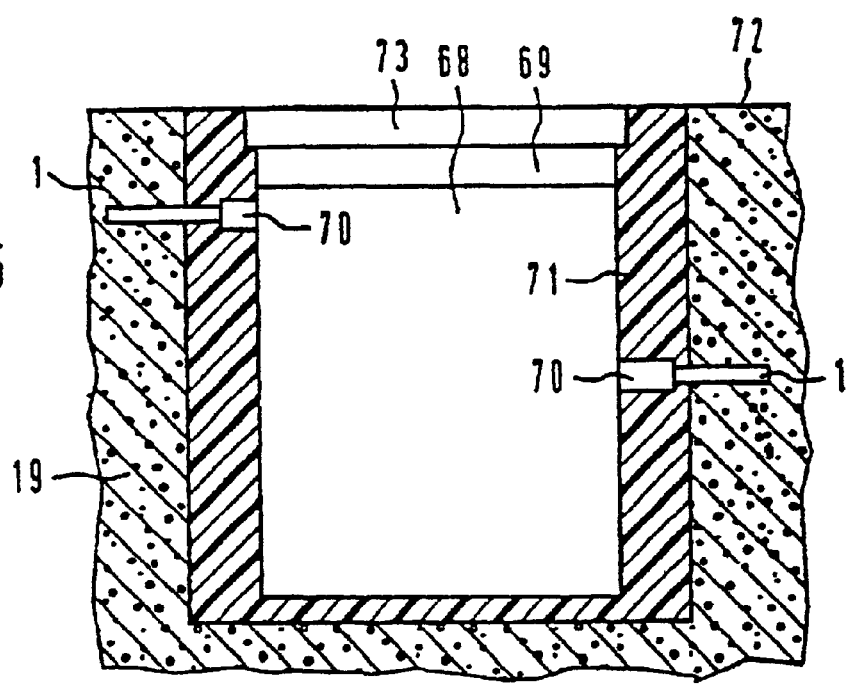
FIG. 15 shows a sleeve for a tubular microcable or minicable.

FIG. 15 illustrates an arrangement for a sleeve 68 into which microcables and minicables 1 are fed via cable inlets 70. The appropriate measures such as connecting or splicing are then carried out in the interior of the cable sleeve. Such a cable sleeve preferably comprises a round steel cylinder and is introduced into a core hole of the ground 17. A sleeve cover 69 which can be placed in position from above closes off the sleeve interior. After the sleeve 68 has been introduced and the microcable 1 has been introduced in the sleeve, the upright core hole, which can lead into the substructure of the road, is concreted into the roadway in the lower region. The sleeve is thus no longer subject to settling. Sealing with respect to the upper road structure 72 is effected with asphalt or liquid hot bitumen. Sealing in the cable inlets 70 takes place, for example, with conventional cutting ring seals or other seals which are known per se for cable sleeves. Thin copper tubes into which the cable ends can be introduced have also proved expedient. These are crimped onto the outer wall of the microcable by radial pressing. These crimped connections are resistant to tension and pressurized water. At the top, the core hole is terminated by a load-bearing cover 73 level with the road surface 72. If necessary, it is also possible for the cover to be located beneath the roadway surface. The optical waveguides may be arranged, in a manner known per se, with excess lengths and splices in the interior of the cable sleeve 68. The round embodiment of the cable sleeve 68 means that it is expedient to introduce the optical waveguides helically, with the result that they can easily be moved upwards if required.

It is also advantageous to use a small shaft instead of the sleeve 68, this small shaft, in turn, receiving a sleeve.

Discharge means and feed means may likewise be run, as minicables or microcables, in a manner of an overhead cable or non-supported cable.

The object of one development of the invention is to find a process with the aid of which it is possible to cut laying channels for minicables or microcables in the solid ground in one operation. The set object is achieved, in accordance with the process explained in the introduction, in that a laying channel is cut by means of a laying unit whose cutting-wheel arrangement is varied in terms of thickness such that the width of the laying channel is adapted in one cutting operation to the corresponding diameter of the microcable or minicable used.

Advantages of the process according to the development of the invention may particularly be seen in that it is now possible to produce laying channels in solid surfaces such as asphalt and concrete, road surfaces, curbstones or stone slabs by means of a laying unit in which the cutting width can be set to the respective diameter of the minicable or microcable used. For this purpose, for example a cutting-wheel arrangement comprising two standard blades with the interposition of a spacer ring is drawn onto the axle of the laying unit. Exchanging the spacer ring means that the cutting width can thus be changed.

In the case of wide laying channels, a central web first of all remains in the ground, but the invention provides measures by which the resulting central web is broken out at its base during the cutting operation. This is effected by appropriate configuration of the circumferential surface of the spacer ring, e.g. by introducing grooves of a suitable shape, for example of a rectangular or sawtooth shape, or by providing bar-like, flexible brushes on the circumference. These also clean the channel of abrasion dust. This results, in particular, in the advantages outlined below:

Production of rectangular laying channels of any width.

The width of the laying channel can be determined by exchanging the spacer ring.

The double cut in one operation means that the wear on tools is uniform, the blades not being subjected to bending stress, so that unbalances do not occur.

The initially produced central web in the laying channel is broken out at the base during the cutting operation.

Appropriate configuration of the outer circumference of the spacer rings means that the laying channel is also cleaned at the same time.

Figure 16:
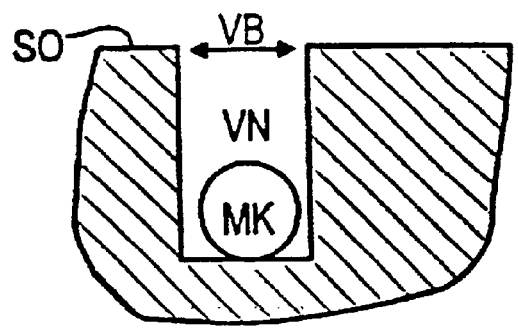
FIG. 16 shows a laying channel for laying a minicable or microcable.

FIG. 16 shows a rectangular laying channel VN in a solid ground surface SO, a double arrow indicating that the channel width VB has to be variable in accordance with the minicable or microcable type MK used in order to be able to achieve the necessary width in a single cutting operation.

Figure 17:
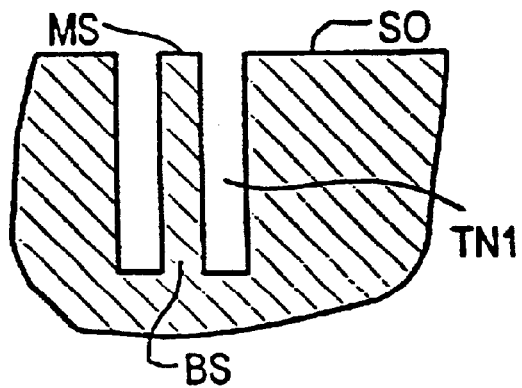
FIG. 17 shows a widened laying channel before the resulting central web has been broken out.

FIG. 17 illustrates the production of the widened laying channel by two blades which are spaced apart from one another in accordance with the respectively introduced spacer ring, with the result that a central web MS first of all remains between the two partial channels TN1 and TN2. However, appropriate circumferential configuration of the spacer ring means that this central web KS is immediately broken off at the base BS during the cutting operation, this resulting in the wide laying channel shown in FIG. 16.

Figure 18:
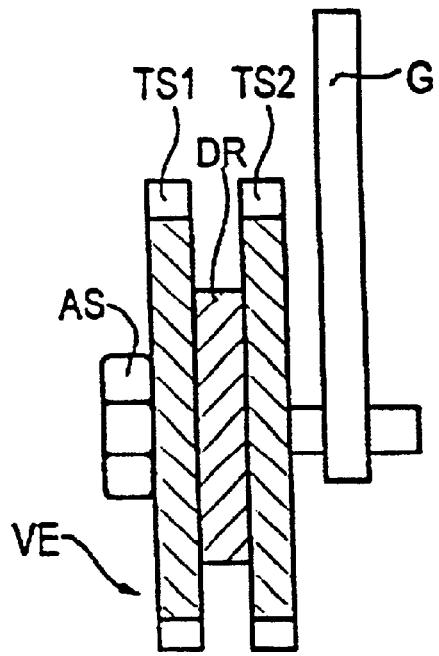
FIG. 18 shows the cross-section through the cutting-wheel arrangement of the laying unit.

FIG. 18 illustrates a cross-section of the cutting-wheel arrangement, which comprises two blades TS1 and TS2 with a spacer ring DR located therebetween, the width of the spacer ring DR being selected such that the ring, together with the two blades TS1 and TS2, provides the necessary width for the laying channel VN. The drive axle AS is introduced in the laying unit VE via corresponding linkages G.

FIGS. 19 to 22 illustrate the configuration of the circumference of the spacer ring DR, the blade TS2 having been removed for this illustration. The blade TS1 is provided with appropriate cutting teeth in the conventional manner. These cutting teeth Z may also be provided with hard metal. If appropriate, the cutters may be exchanged. Preferably, the cutters should be made to protrude alternately beyond the cutting blade TS3 from the blade centre, as can be seen from FIG. 22. This screwing action allows the blade TS3 to cut a clearance at the channel flanks FL. "Seizing" is avoided. The spacer ring DR is provided on its circumference with grooves or cutouts of widely varying configuration which break off the central web and clean the laying channel. An air pressure by which the laying channel is freed of fragments is produced by way of the cutouts or grooves. This simultaneously achieves self-cleaning of the laying channel as it is produced.

Figure 19:
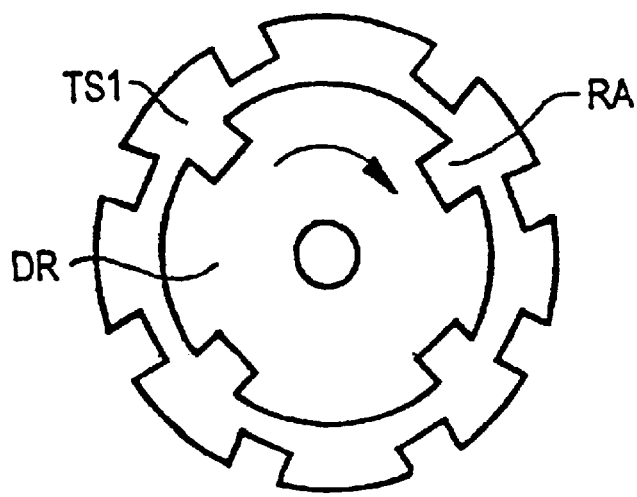
FIG. 19 shows a spacer ring with rectangular grooves on its outer circumference.
Figure 20:
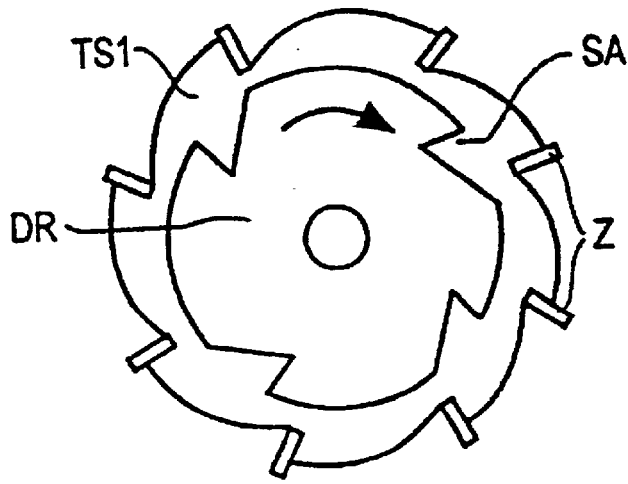
FIG. 20 shows a spacer ring with sawtooth-shaped grooves on its outer circumference.
Figure 21:
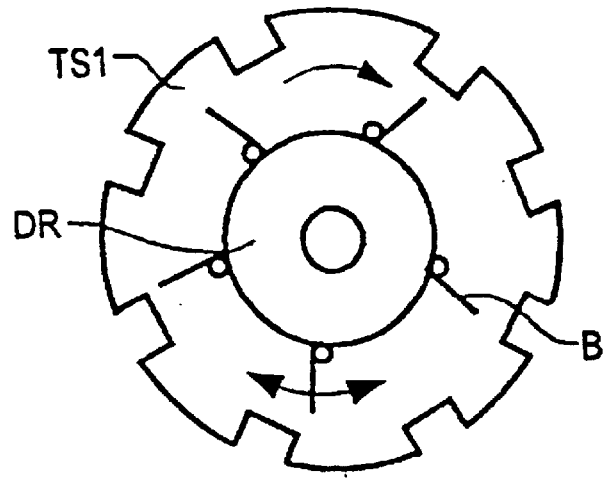
FIG. 21 shows the arrangement of brushes on the outer circumference of the spacer ring.

FIG. 19 illustrates rectangular cutouts RA, and FIG. 20 illustrates sawtooth-shaped cutouts SA, on the outer circumference of the spacer ring DR. In FIG. 21, this operation is carried out with the aid of bar-like, flexible brushes B by way of which the central web is broken and the fragments are removed from the laying channel VN.

Figure 22:
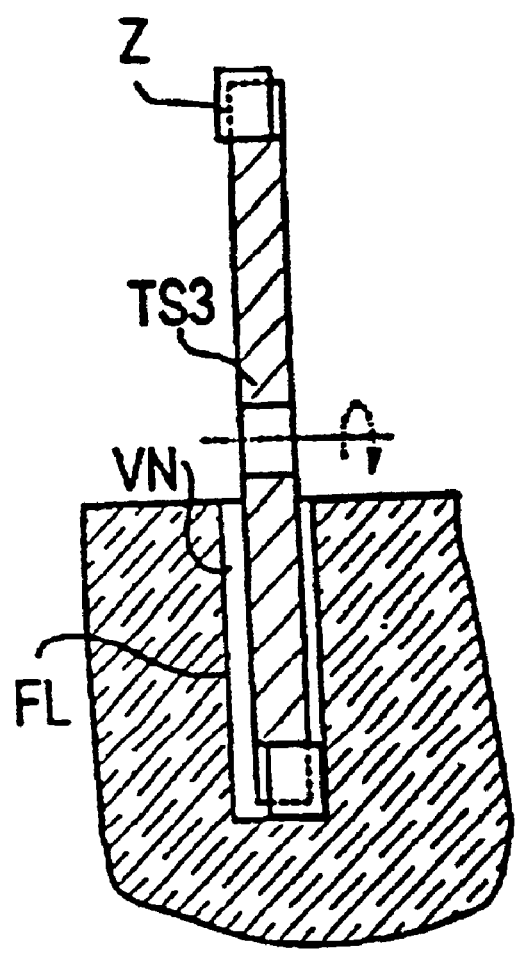
FIG. 22 shows the lateral offset of hard-metal teeth.

FIG. 22 illustrates the lateral offset or staggering of the hard-metal teeth Z, which make it possible for a blade TS3 to run freely. This arrangement applies for each of the blades.

It is also possible to use such cutouts RA to cut out a material which has the properties of bitumen.

The object of a further development of the invention is to find a process by which the laid minicable or microcable can be removed again from the laying channel, in which case the filling material has to be removed beforehand. The set object is achieved according to the invention, in accordance with a process of the type mentioned in the introduction, in that a tension-resistant release element for lifting the laid minicable or microcable is introduced, when said cable is laid in the laying channel, above the minicable or microcable in the filling material of the laying channel, in that the tension-resistant release element is then drawn out during the lifting operation, in which case the laying channel is also released of filling material, and in that the minicable or microcable is then removed from the laying channel.

The problem with lifting the minicable or microcable (only the term microcable will be used from now on) is that the cable runs in a living channel which is covered in a sealed and well-adhering manner with a filling material above the microcable. In this case, use is made of a filling material which has viscous and adhering properties, for example, bitumen. Accordingly, the microcable cannot be drawn out before the filling material is removed. Likewise, further, secondary cutting of the laying channel is not an option since the filling material would only smear on account of its viscous consistency. The invention solves this problem, then, in that a tension-resistent release element is embedded above the microcable, which release element can be drawn out or pulled out if required and also removes the filling means in this operation. It is advantageous here if, from the outset, the microcable is not wetted with the filling means, so that, as far as possible, there is no adherence between the two. The tension-resistant release element may be designed as a separate element, for example in the form of a line, of a profile body or of a strip. Such release means may consist, for example, of plastic or of metal, for example of steel. However, it is also possible for special release means or plastic materials to be applied around the microcable, for example a plastic film of polyethylene, so that adherence between the microcable and the filling means occurs only negligibly, if at all. Furthermore, it is possible for this purpose that the laying channel be filled above the microcable with a release means which is designed as a filling profile and is pressed into the laying channel, if appropriate with additional sealing with respect to the borders of the laying channel. Once again, a viscous material such as bitumen is particularly suitable for this purpose. Particularly elastic materials, for example rubber or elastic plastics, are suitable for such a filling profile.

However, the tension-resistant release element may also form a constituent part of the sheathing of the microcable, it being possible for the sheathing material to be separated easily from the microcable, so that, once again, the filling material is first of all removed with the tension-resistant release element during the lifting operation.

If the tension-resistant release element consists of electrically conductive material, it may also be used, in addition, for the power supply along the microcable.

Figure 23:
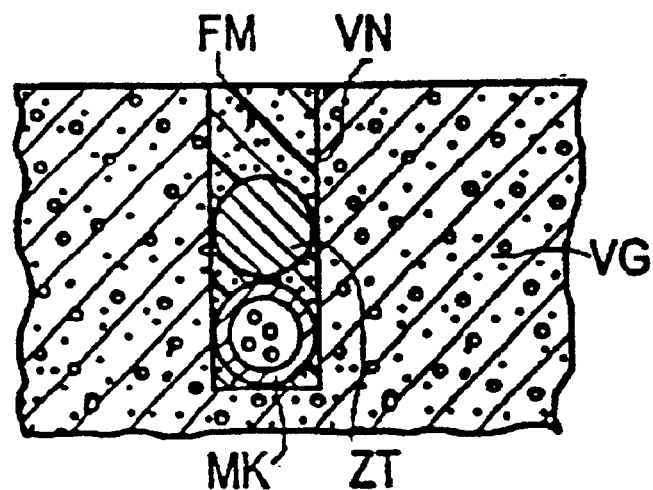
FIG. 23 shows a laid microcable with a tension-resistant release element laid in addition.

It is illustrated in FIG. 23 that a microcable MK is introduced in the cut laying channel VN of the solid ground VG and, according to the invention, a tension-resistant release element ZT in the form of a metal or plastic line has been arranged above said microcable during the laying of the same. Above this, the laying channel VN is filled in a sealed manner with a filling material FM, for example consisting of bitumen. Before the microcable MK is lifted, the tension-resistant release element ZT is, then, drawn out in order also to remove the filling means FM from the laying channel VN, this resulting in the laying channel VN then being free and it being possible to lift the microcable MK without risk.

Figure 24:
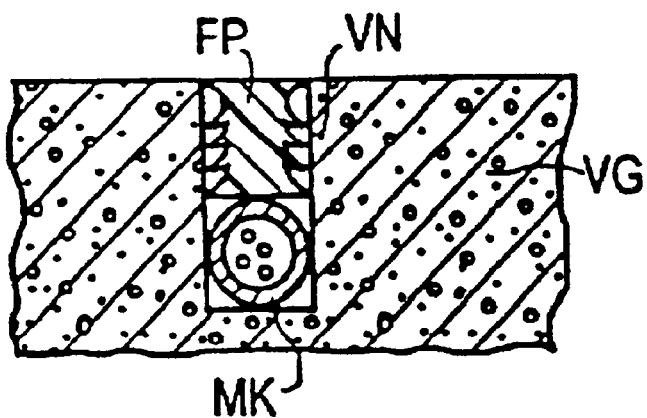
FIG. 24 shows a laid microcable with a filling profile as filling means for the laying channel.

FIG. 24 shows that it is also possible for the laying channel VN to be filled with a tension-resistant filling profile FP, which is drawn out if required. This tension-resistant filling profile FP may additionally be introduced with a sealant, for example with bitumen, this resulting in the laying channel VN being sealed reliably.

The object of a further development of the invention is to provide a process for the power supply of a minicable or microcable with optical waveguides. The set object is achieved, by a process of the type mentioned in the introduction, in that the metallic tubes of the microcables or minicables are connected to the central power supply.

In general, at the present time, the power is supplied by an additional power cable which is supplied from a central point. The disadvantage is that a separate power cable has to be laid over a large distance. Costs for an additional cable route and voltage losses have to be accepted. Additional measures for the power supply likewise have to be taken for the optical-waveguide submarine cable known per se. However, a minicable or microcable of the type described comprises a tubular metal sheath. This protects the optical waveguides against damage during laying, guarantees a certain excess length of the fibres and is stable with respect to transverse forces. Moreover, the solid ground in which the laying channel is provided gives the minicable or microcable the necessary protection against external mechanical influences. The electric properties of this minicable or microcable, however, are not utilized. If, then, the metal tubes of these minicables or microcables are electrically interconnected at the connecting locations, as is effected, for example, with the aid of metallic connecting sleeves, this system can be used for a power supply. A second conductor may provide the return conductor or, if it is insulated, the power supply. With the return conductor, insulation may be dispensed with if required. The return conductor may additionally assume protective functions.

Such a minicable or microcable and the power supply may also be produced as a continuous cable. A separate return conductor can be dispensed with if two insulated microcables are laid. Use may also be made of two microcable tubes in one microcable with corresponding common insulation. The cable sheath insulates the tubes with respect to one another and to the earth. Such a minicable or microcable can easily be bent around a narrow axis and laid.

With such a power supply, the strength and the conductivity are realized by way of the cross-section of the cable sheath or of the metallic tube. Sufficient electrical interconnection is guaranteed by crimping metallic sealing heads of a cable sleeve to the metallic tube of a minicable or microcable. For the return conductor of the power supply, use may also be made, for example, of cable holding-down devices, if these consist of metal. The task of these cable holding-down devices is, in the original sense, to position the cable securely at the correct laying height in the laying channel. When direct current is used, it is also possible to dispense with a return conductor if earthing takes place. If the metallic tubes of the minicables or microcables are provided with an insulation layer, then, in addition to the possibility of insulated power supply, the following advantages can also be achieved:

- corrosion protection for the metal
- the metal tube is protected against mechanical damage during laying
- the insulation layer forms a wear layer for the drawing-in operation of the microcable
- the insulation layer forms heat insulation when sealing the laying channel with hot bitumen
- the insulation layer forms vibration insulation in the case of heavy traffic.

Figure 25:
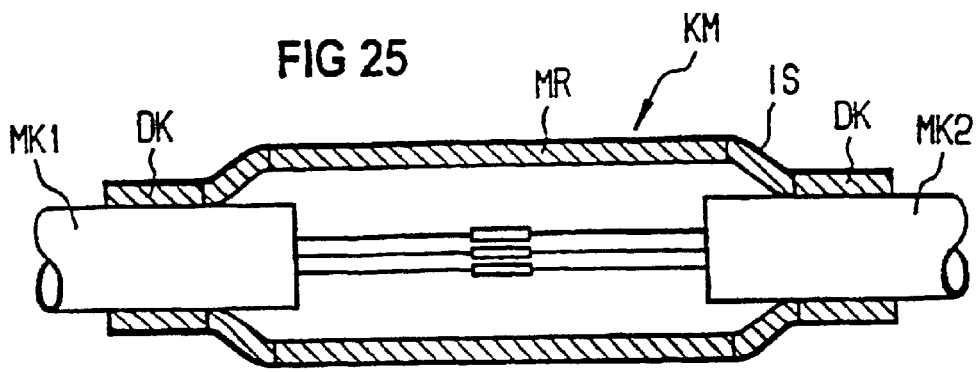
FIG. 25 shows the electric connection of two minicables or microcables via a metallic cable sleeve.

FIG. 25 shows the through-connection of the power supply with the aid of a metallically conductive cable sleeve KM. The power is supplied through the microcables MK1 and MK2, the ends of which are electrically interconnected by the sleeve tube MR. The electric contacting, the relief of tension and the sealing of the microcables MK1 and MK2 take place at the crimp locations of the sealing heads DK. In this case, the outer side of the cable sleeve KM is additionally provided with an electric insulation IS.

Figure 26:
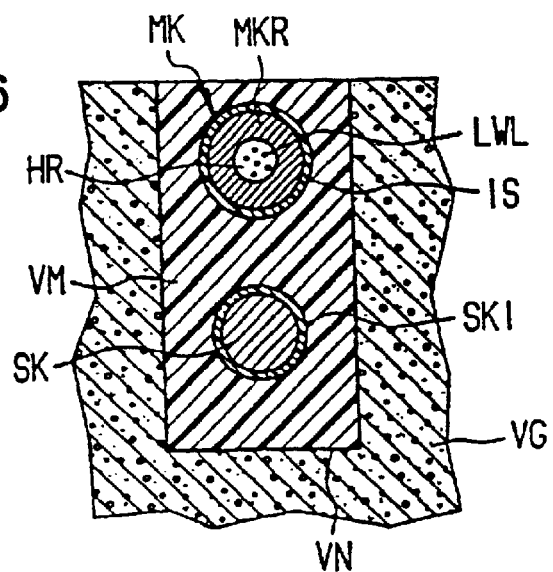
FIG. 26 shows an insulated microcable with an insulated power cable.

FIG. 26 illustrates in the position of a microcable MK which [lacuna] in the laying channel VN above a power cable SK provided with an insulation SKI. This power cable SK is a single-phase power cable and the tube MKR of the microcable MK is provided with a plastic insulation IS. After the introduction of the cables, the laying channel VN in the ground VG is filled with a sealing compound VM. The power is thus supplied via the insulated microcable MK and the insulated power cable SK.

Figure 27:
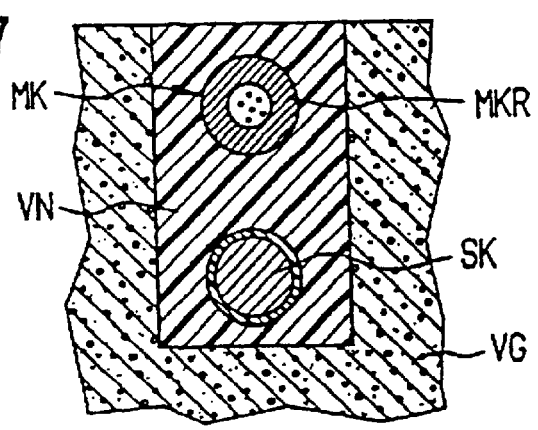
FIG. 27 shows a non-insulated microcable with an insulated power cable.

FIG. 27 shows the arrangement of a non-insulated microcable MK with its metallic tube MKR, in which the optical waveguides are arranged, above an insulated power cable SK, within a laying channel VN. The single-phase power-supply cable SK is, once again, insulated and the non-insulated tube MKR of the microcable MK is earthed. In this case, an insulation can be dispensed with.

Figure 28:
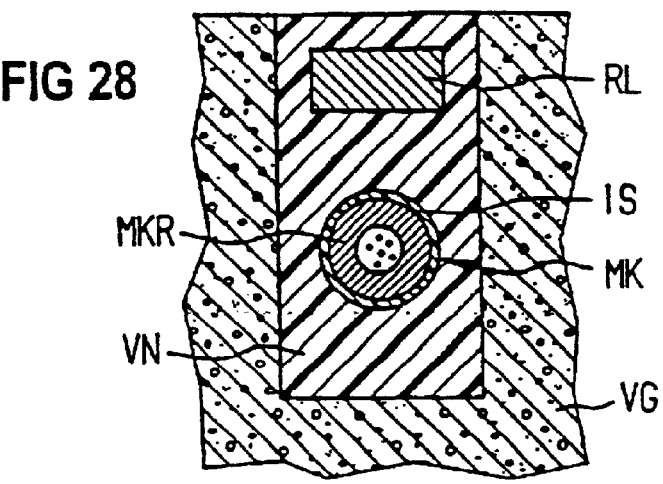
FIG. 28 shows a non-insulated power cable with an insulated microcable.

FIG. 28 shows the power supply through a microcable MK whose tube MKR is provided with an insulation IS. Above this, an earth strip, as return conductor RL, ensures the return conduction. In this case, the return conductor RL serves simultaneously as additional protection for the microcable MK.

Figure 29:
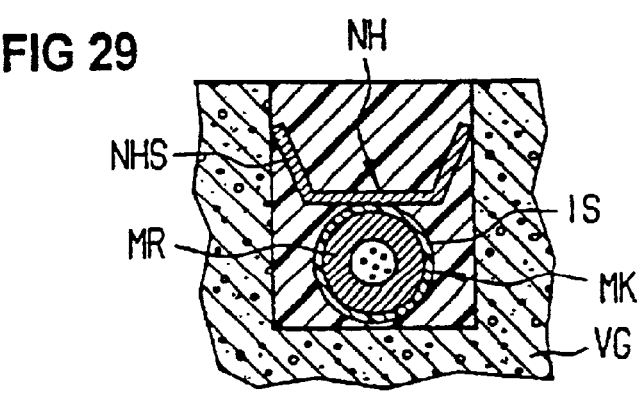
FIG. 29 shows an insulated microcable with a cable holding-down device.

FIG. 29 shows the laying of a microcable provided with insulation IS, in which case a continuous cable holding-down device NH secures the introduced cable MK in its vertical position. The cable holding-down device NH has obliquely positioned side walls NHS which are supported against the wall of the laying channel VN. In this case, return conduction of the power supply takes place via the cable holding-down device NH, which serves moreover as an upward protection and guard.

Figure 30:
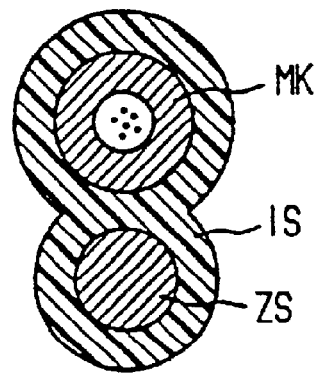
FIG. 30 shows a microcable with an additional cable in a common insulation.

FIG. 30 illustrates the power supply through a microcable MK which is arranged, with an additional wire ZS, with an insulation IS. Said additional wire ZS is electrically insulated with respect to the microcable MK. Moreover, the material of the additional wire is determined such that it can be used as a supporting wire with the necessary nominal tensile force. It consists, for example, of steel or bronze.

Figure 31:
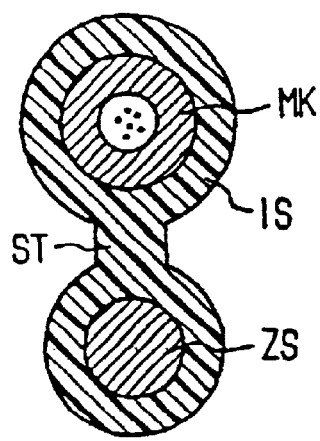

FIG. 31 shows the power supply, once again, via a microcable MK. An additional wire ZS is integrally moulded on the microcable MK via an insulation IS, the connection between the two taking place via a web ST. The microcable MK may be separated from the additional wire ZS in the region of the web ST if required. Such a separation is practical, for example, for bridging connecting sleeves.

Figure 32:
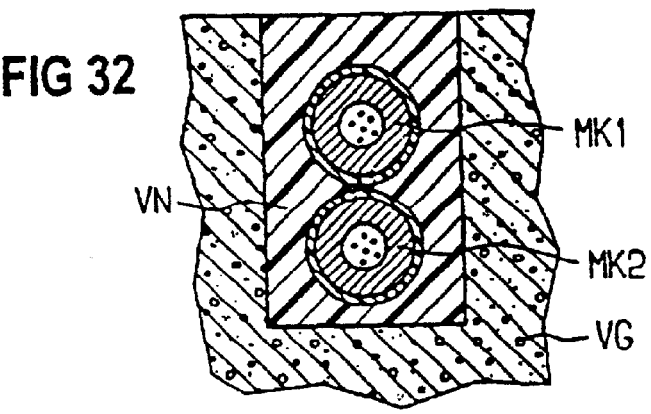
FIG. 32 shows two electrically insulated minicables or microcables.

FIG. 32 shows the arrangement of two microcables MK1 and MK2 located one above the other in the laying channel VN. The two microcables MK1 and MK2 are insulated separately and can be laid separately from one another or together. Each microcable may expediently be spliced to a single sleeve and electrically interconnected.

Figure 33:
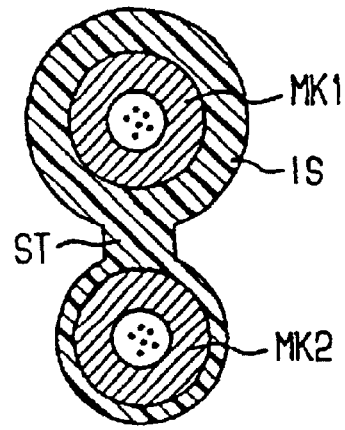
FIG. 33 shows two minicables or microcables within a common insulation.

FIG. 33 shows the power supply through two microcables MK1 and MK2 which are located one above the other and are insulated separately, but are connected to one another via a web ST. For splicing, the microcables MK1 and MK2 can be separated from one another in the region of the web ST, with the result that each microcable MK1 or MK2 can be spliced in different single sleeves and electrically interconnected.

The object of a further development of the invention is to find a process with the aid of which a laid minicable or microcable can be located. The set object is, then, achieved, in accordance with process of the type mentioned in the introduction, in that the route of the optical minicable or microcable laid in a laying channel is followed with the aid of a detector.

Advantages of the invention over the prior art can be seen, in particular, in that, with the aid of a detector, the laid minicable or microcable can be traced so accurately that, for example, it can even be entered, with relatively low tolerances, for archiving in town street plans and cable-route plans. The process using a detector according to the invention can also be used to locate the cable in the ground for repair purposes, it being possible for interruptions in the cable to be localized accurately. It is just as important, before the laying channel is cut, to check the route as to whether or not there are already supply lines in the ground. Such a process, which is based on the operation of suitable detectors, can thus be used for the acceptance and approval of a new cable route, since the quality of laying and the laying depth can be established at any time.

It is thus expedient to arrange such a detector, as a functional unit for locating cables, in front of a joint-cutting machine, so that any metallic object, for example a cable or supply line, which is located in the ground, is detected in each case. For laying minicables or microcables, detection can take place via the metal tube itself, via a return conductor which is carried along or else via cable holding-down devices in the laying channel. These cable holding-down devices may also be used, for example, for the power supply and for a protective function for locating the minicable or microcable. It would be possible for holding-down devices to have a fixedly predetermined code or else to be freely programmable. A service vehicle which is used to trace the laid cable is expediently made available for this process. This unit produces the reference for marking points, and stores the route in which the optical cable is laid, so that the route can be transferred onto existing street plans. In this way, both the position and the depth of the laid microcable can be established.

FIG. 34 describes the principle of the process for locating an optical cable, in particular a minicable or microcable, with the aid of a detector D which is accommodated in a service vehicle. When this vehicle drives over a laying channel VN, it is established by way of the emitted and reflected locating signal OS that a laying channel VN has been driven over. In this exemplary embodiment, the microcable MK has been laid in the laying channel VN, and the laying channel VN has then been filled with filling material, for example bitumen, metallic fillers having been added to the filling material.

FIG. 35 shows a longitudinal section through a laying channel VN in solid ground VG. The microcable MK is introduced at the base of the laying channel and is held in position with the aid of cable holding-down devices NH, which are of a dowel-like design. The individual cable holding-down devices NH are provided with magnets whose magnetic fields can be located by the detector passing over them. The alignment of these magnets may be the same or else alternately different in all of the cable holding-down devices NH. Alternate alignment of the magnets M with the poles MN and MS can produce a system of alternate magnetic fields by means of which it is even possible to establish a coding for the laid minicable or microcable. The laid cables can be identified accurately in this manner, with the result that it is possible to rule out mix-ups during repair work.

FIG. 36 illustrates a laid microcable MK, in the laying channel VN, which is held in position by magnetic cable holding-down devices NHN. Here too, poles of the magnetic cable holding-down devices NHM may be clamped in the laying channel VN with alternate orientation of the magnet poles NHMN and NHMS, so that coding of the cable route is possible in this case as well. The U-shaped cable holding-down devices NHN wedge in during laying and are supported on the channel wall. The U-shaped cable holding-down devices are magnetically insulated with respect to one another and are pressed in individually by the cable-laying machine. These magnetic cable holding-down devices NHM may be permanently magnetic or magnetized individually during laying. Here too, the magnetic field can be detected through the filling material, which is not illustrated in this case.

FIG. 37 illustrates, once again, a microcable MK laid in a laying channel VN, this microcable being held in position by bar-like cable holding-down devices SNHM. These bar-like cable holding-down devices SNHM likewise wedge in during laying and are supported against the channel wall. Once again, the bar-like cable holding-down devices SNHM are magnetically insulated with respect to one another, and may be permanently magnetic or only magnetized individually during laying. Here too, it is possible to allocate an individual coding (morse) to each laid optical cable by alternating the magnet poles. It is also possible in this case, in the manner described, for the magnetic field to be detected by a detector in accordance with the process according to the invention.

Figure 38:
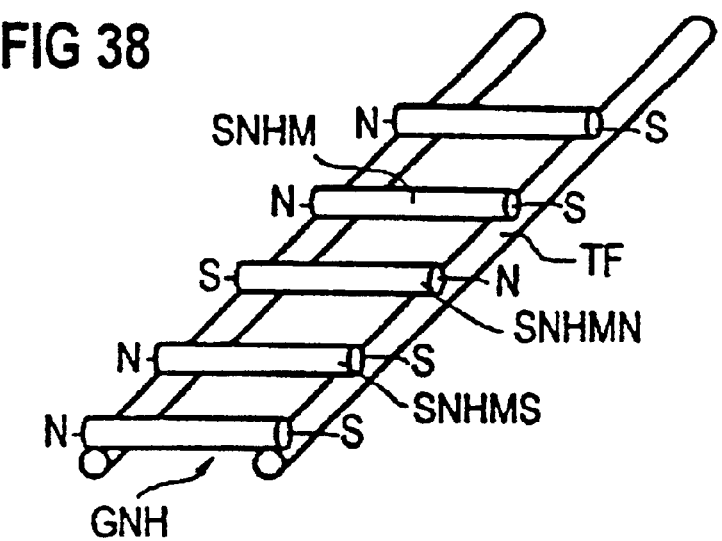
FIG. 38 shows bar-like cable holding-down devices which are lined up in a row on support filaments.

A grid-like cable holding-down device GNH is illustrated in FIG. 38. Here, the bar-like, magnetic cable holding-down devices SN, HM are fastened on two longitudinally running support filaments TF, the individual bar-like, magnetic cable holding-down devices SNHM being magnetically insulated from one another. During the laying operation, this grid-like cable holding-down device GNH can be easily unwound and introduced above the cable in a clamping manner. Such a structure can also be used in a simple manner to measure the length of the cable route since a kind of graduated scale is provided by the uniform spacing of the bar-like cable holding-down devices SNHM. The individual bar-like cable holding-down devices SNHM may be permanently magnetic or only magnetized individually during laying. Here too, it is possible to provide a coding by alternating the magnet poles.

Figure 39:
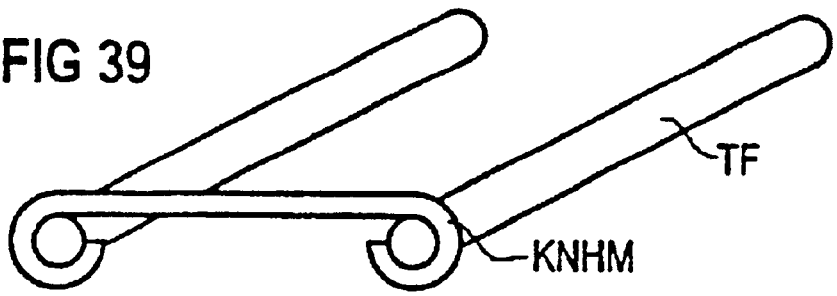
FIG. 39 shows a cable holding-down device which has its ends clamped on support filaments.

FIG. 39 illustrates that the cable holding-down devices KNHM can be, as it were, tacked or clamped onto the support filaments TF. This may also take place on site, in which case any desired coding pattern can be produced. Such a coding may also take place, for example, by varying the spacing between the individual bar-like, magnetic cable holding-down devices KNHM.

Figure 40:
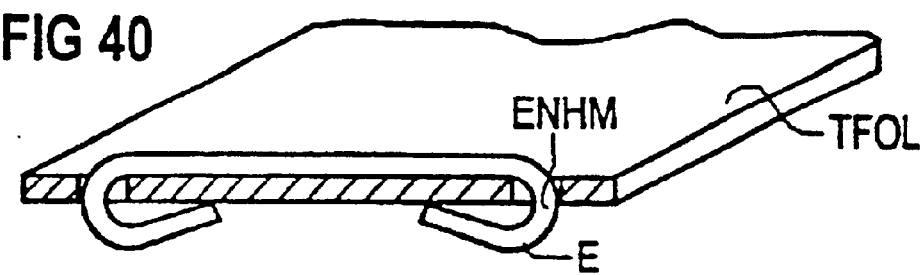
FIG. 40 shows a cable holding-down device which is fitted into a support sheet.

It is illustrated in FIG. 40 that the cable holding-down devices ENHM may also have their ends E fitted onto a support sheet TFOL. Here too, it is possible to vary the polarity and the spacing of the individual bar-like cable holding-down devices ENHM for a corresponding coding. During filling of the laying channel with hot bitumen, the sheet then melts, with the result that the hot bitumen can fill the laying channel between the bar-like magnets ENHM. The bar-like cable holding-down devices ENHM remain wedged in the laying channel and hold the microcable in the corresponding position.

Figure 41:
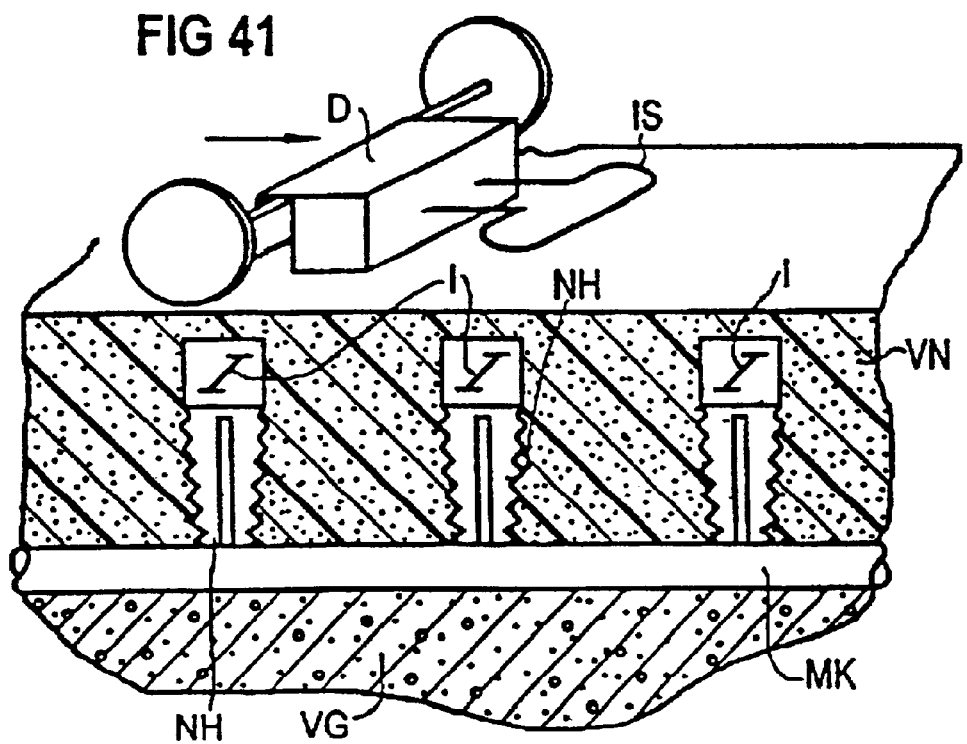
FIG. 41 shows the laying of the microcable with electronic signal generators as holding-down devices.

In addition to the abovedescribed possibility of purely passive coding by cable holding-down devices NH, an active coding provided by electronic components is illustrated in FIG. 41. FIG. 41 is derived from FIG. 35. However, the magnets have been replaced by electronic pulse generators I. The information of the pulse generators I can be interrogated from the road surface by a movable induction loop IS.

The pulse generators I can emit cable-specific information, e.g. operator name, route to which the relevant cable belongs, laying depth, laying date, number of optical waveguides, etc.

Figure 42:
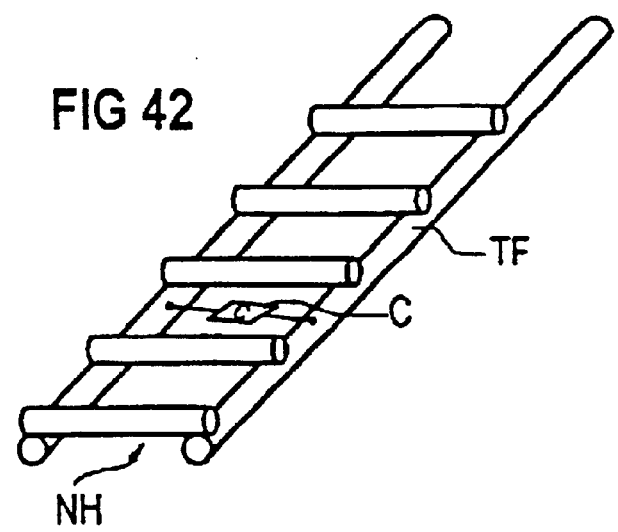
FIG. 42 shows a chip which can be freely programmed from the outside, is fitted along the microcable and is lined up on support filaments.

A freely programmable chip C which is assigned to the microcable MK or to the holding-down device NH is illustrated in FIG. 42. It can store and reproduce information (cable, sleeve, operator, free optical waveguides, etc.). Interrogation can take place inductively via the support filaments (TF) or by electrically contacting the cable sheath or the carrier filaments from the sleeve.

Figure 43:
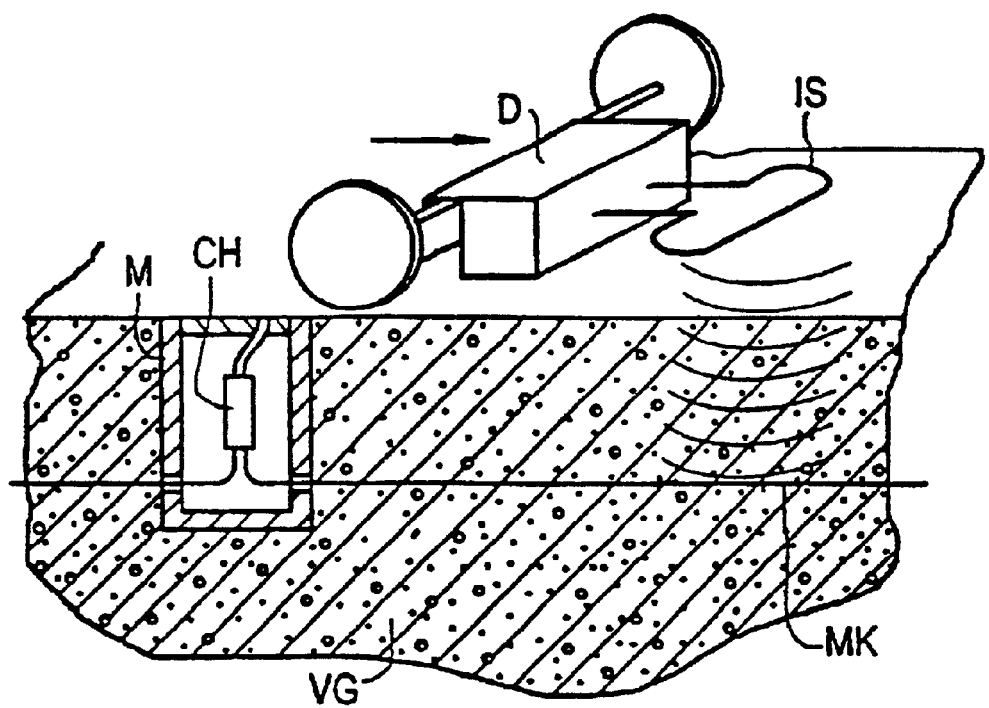
FIG. 43 shows a programmable chip which is accommodated in a sleeve.

In FIG. 43, the programmable chip CH is accommodated in the sleeve M, so that information can be emitted from the sleeve. It is also possible for further electronic active components to be accommodated here. The power supply can take place from here, it also being possible for the support surfaces TF of the cable holding-down devices NH to be designed, for example, as power-supply conductors.

The abovementioned optical cables are referred to as microcables and are preferably laid in laying channels in solid ground. On account of their small diameters, the laying channels can be kept very narrow, so that they can be produced with the aid of cutting processes. Particularly suitable laying surfaces are substructures and roads consisting of asphalt or concrete. The laying depth is very small and is between 7.5 and 15 cm. Such optical-waveguide cable systems are particularly wellsuited for laying in surfaces which have already been established for this purpose, since high-outlay excavation work does not have to be carried out. Moreover, the laying time is very short, which is particularly advantageous in the case of roads. After the introduction of the microcables into the cut laying channels, these are filled with suitable filling material, for example with bitumen. Further examples of suitable laying channels are expansion joints which are provided between individual concrete slabs or are provided as a precautionary measure in concrete slabs for road surfaces. Microcables may likewise be laid in these expansion joints. These expansion joints are likewise filled with filling material, so that the microcables are protected.

However, it must also be possible for such microcables to be lifted, for example when repair work has to be carried out on the tube. These microcables cannot, however, be removed from the laying channel together with the filling material since the forces required for this purpose would damage the microcable further. Moreover, the tube has to be restored in the region where damage has been established and then introduced into the laying channel again.

A further object of the invention is to develop a process by which it is possible to remove a microcable of the abovedescribed type from the laying channel and to repair the same. The set object is, then, achieved, with the aid of a process of the type mentioned in the introduction, in that, with the aid of a unit for exposing the microcable, the filling material is removed from the laying channel over a length which is required for the introduction of a repair set, said repair set being formed from two cable sleeves, two equalizing loops and a connecting tube between the cable sleeves, in that the microcable is lifted from the laying channel freed of the filling material, in that the tube of the microcable is shortened over a length which corresponds to the repair set and in that the repair set is connected tightly to the two ends of the microcable.

Microcables of the abovedescribed type are laid in the upper region of roads and footpaths. In terms of dimensions, they are very small and could thus easily be overlooked when earth work is carried out, so that the possibility of damage is considerably higher than in the case of conventionally laid communication cables. It is thus necessary to have a quick process for repairing a damaged microcable, by means of which the damage can be rectified in a relatively simple manner and in a short period of time. A repair set is designed for this purpose, which set is made up of existing standard parts, that is to say of two cable sleeves with a connecting tube located therebetween, this connecting tube bridging over the length of the damaged area, and of two connection units which are connected to the ends of the damaged microcable. The damage location, for example a cut-through tube of the microcable, may be located, for example with the aid of an electric test signal, by radiation. However, if the tube is still connected metallically, the defect location In the optical waveguide has to be traced and localized, for example, with the aid of an Optical Time Division Reflectometer (OTDR). In this case, some of the introduced light is reflected back by way of defect locations in the glass (soiling, splice, etc.). If the transit time is measured, the spacing between the defect location and the transmitter can be measured.

For the repair, the microcable has to be exposed, on either side of the defect location, to such an extent that there is sufficient excess length for manipulation and for splicing in the cable sleeves. For this purpose, however, first of all the laying channel has to be freed of filling material since it is not otherwise possible for the microcable to be lifted without further damage. The laying channel is exposed by cutting out or scraping out—possibly in a number of layers—or by heating the sealing compound, by cutting out and removing with the aid of a cutter guided in the laying channel, or by heating the microcable or further electrically heat-conductive parts which may be located in the channel close up beside the microcable.

In each of the two cable sleeves, which are suitable for receiving microcables at least in the inlet region, in each case one end of the defective microcable is introduced and is spliced there to optical waveguides, which are guided to the second cable sleeve via the connecting tube. These optical waveguides are then spliced, in the second sleeve, to the optical waveguides of the second end of the defective microcable. The cable sleeves are expediently sunk in core holes which are cut in tangentially beside the exposed laying channel. The inlets of the cylindrical cable sleeves are arranged tangentially on the sleeve cylinder, with the result that the inlets of the microcable connections in the form of equalizing loops only have to be deflected to a slight extent. The microcable connections likewise comprise tubes and are designed as equalizing loops, so that it is possible to compensate for tolerances and longitudinal expansion when the sleeves are introduced and during operation. The tight connections to the microcables are produced by crimping the ends of the equalizing loops onto the ends of the microcable. After these operations, the laying channel can be filled with filling material again.

Figure 44:
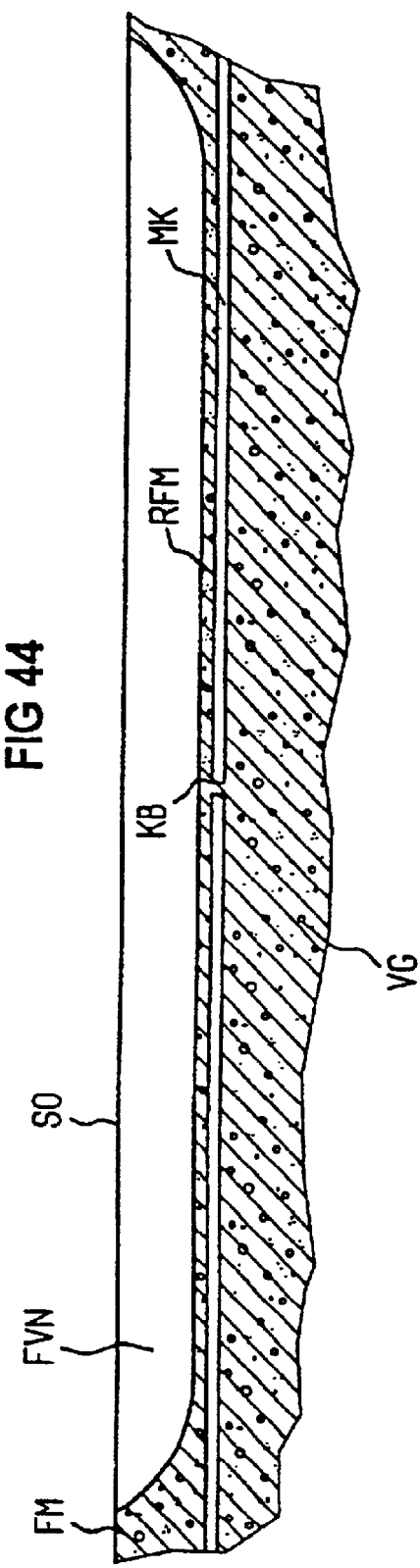
FIG. 44 shows a defective microcable.

A break KB in a microcable NK is illustrated in FIG. 44, the filling compound having already been removed from the laying channel over a length which is necessary for the repair. All that is left in the exposed laying channel FVN, which is provided, for example, in a solid road surface VG, is a small layer of filling compound above the microcable NK, which layer of filling compound, for safety reasons, is not removed in its entirety, so that the microcable MK is not damaged mechanically by the tool. An appropriate control means as is further explained at a later point in the text is suitable for this purpose. The laying channel with the virtually exposed microcable MK is then accessible from the road surface SO, so that the two ends of the microcable MK which is to be repaired can then be removed simply and carefully.

Figure 45:
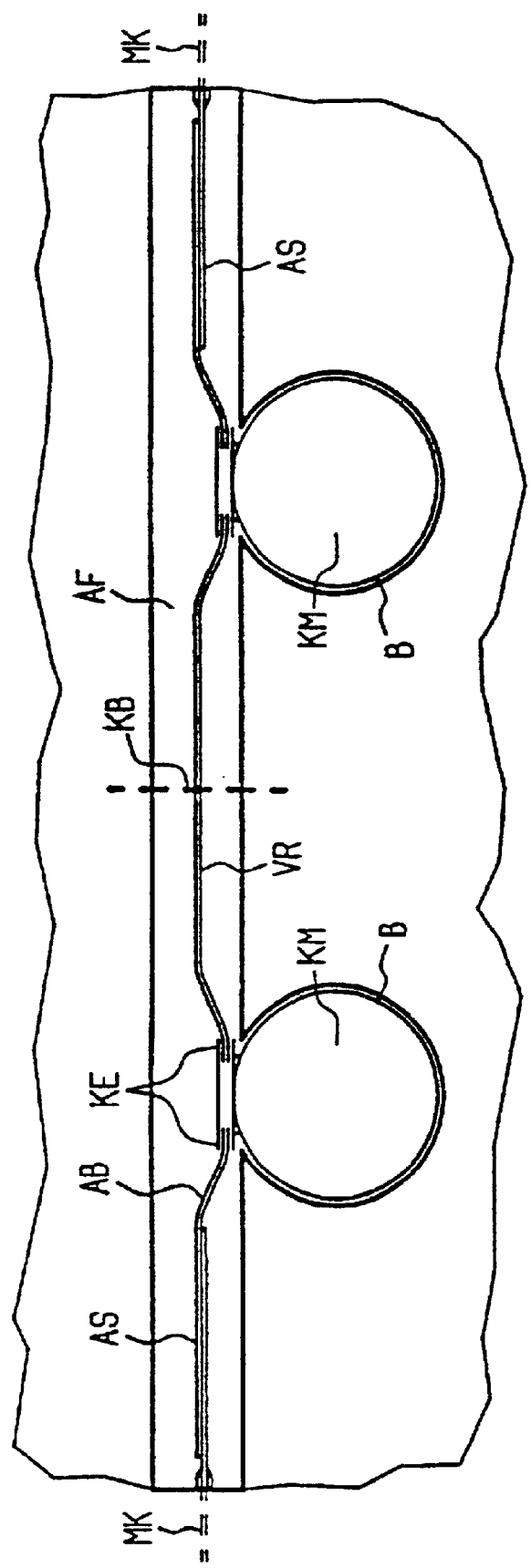
FIG. 45 shows a plan view of the repair location.

FIG. 45 illustrates the already outlined process for repairing a microcable MK which is broken at the location KB, the exposed laying channel FVN being viewed from above in this case. It can be seen that two core holes B have been drilled vertically into the ground, virtually tangentially beside the exposed laying channel FVN, at a spacing which is required for the excess lengths of the optical waveguides, and a cylindrical cable sleeve KM has been introduced into each of the core holes. These cable sleeves KM are designed for receiving microcables and have tangentially running cable-sleeve inlets KE to which tubular equalizing loops AS are connected. The diameter of these tubular equalizing loops AS is adapted to the diameter of the microcable MK, the tight connections usually taking place by crimping AK. The equalizing loops AS serve for equalizing tolerances and expansions. Since the cable sleeves KM have tangential cable inlets KE, the equalizing loops AS can be fitted on with only small bends, so that they can be run into the exposed laying channel FVN without buckling or stressing.

Figure 46:
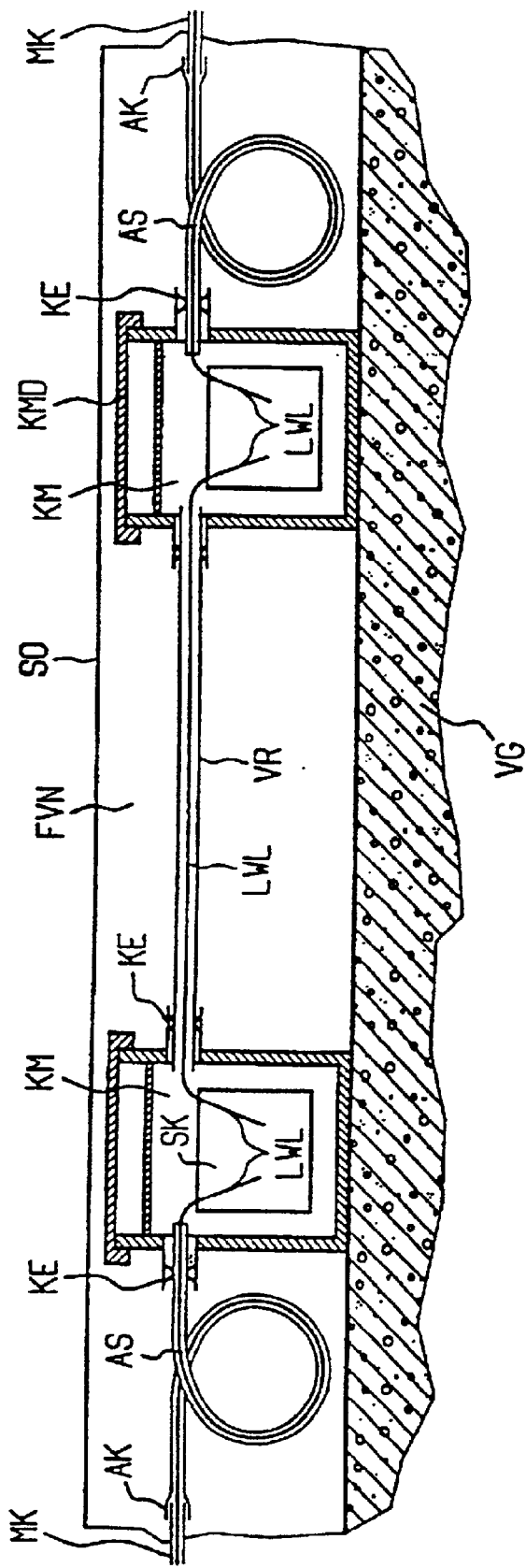
FIG. 46 shows a cross-section of the repair location.

FIG. 46 shows the arrangement in accordance with the outlined repair process and constitutes a longitudinal section of the arrangement according to FIG. 45, for the sake of simplicity the cable sleeves being illustrated in a sectional and simplified form in order better to show the conditions. It can thus be seen that the equalizing loops AS are connected by means of crimping AK, on the one hand, to the tube ends of the microcable MK which is to be repaired and, on the other hand, to the cable inlets KE of the cable sleeves KM. The optical waveguides LWL of the microcable MK are each fed to the corresponding cable sleeve KM by way of the equalizing loops AS and, there, are spliced, at splicing units SK, to optical waveguides LWL which lead, via the connecting tube VR, to the respectively second cable sleeve KM. All the connections can be restored in this manner. After the cable sleeves KM have been closed off, the previously exposed laying channel FVN can be filled with filling material again.

Figure 47:
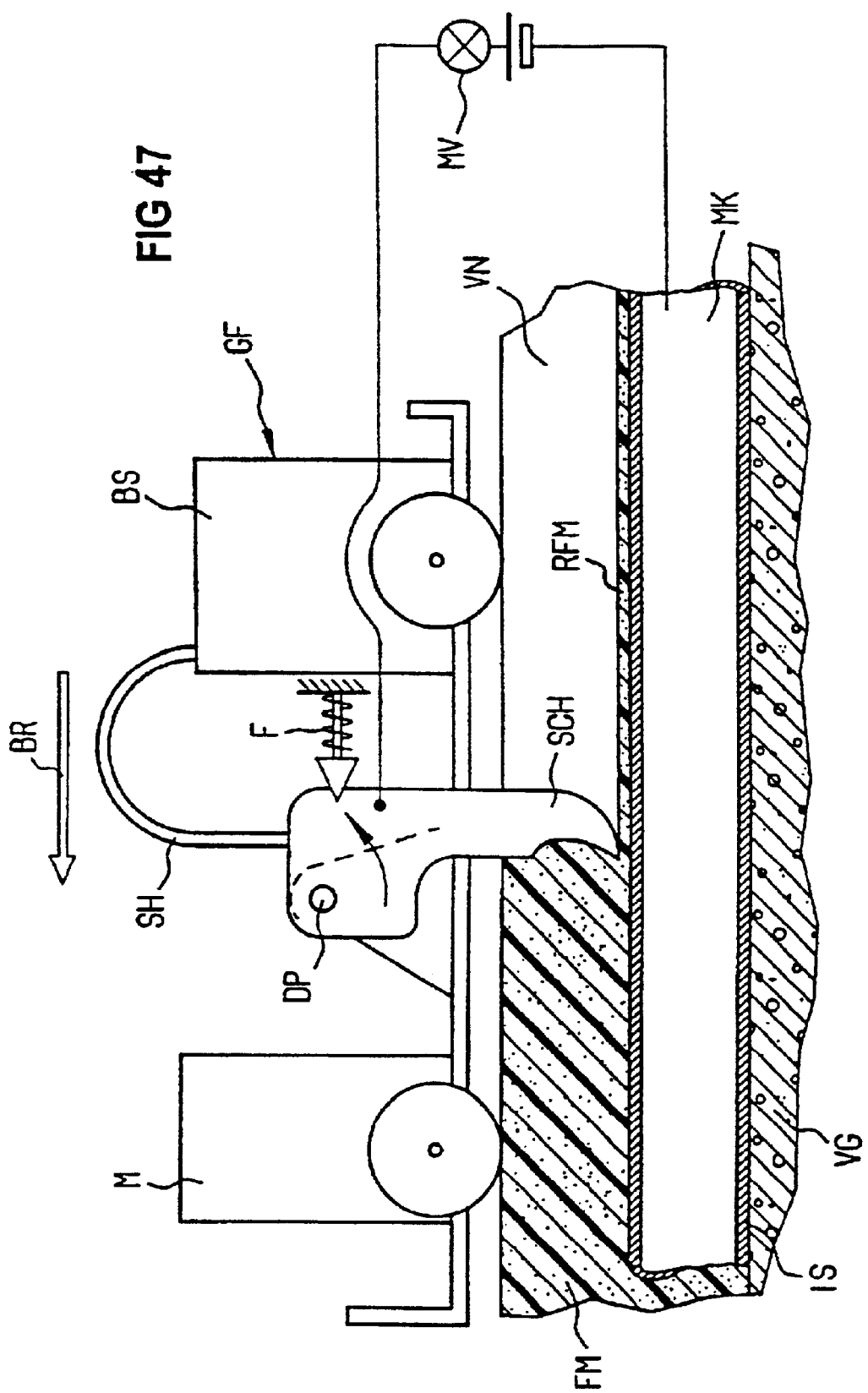
FIG. 47 shows a unit for exposing the laying channel.

FIG. 47 shows a unit GF for removing the filling compound FM from the laying channel VN provided in solid ground VF. A microcable MK is laid at the base of said laying channel VN and has to be lifted, for example, due to a break in the tube. In this case, the microcable MK is provided with an insulation layer IS. For the purpose of removing the filling compound FM, use is made, in this process, of a heated cutter SCH which is mounted cardanically, that is to say rotatably, at a pivot point DP of the unit GF and thus compensates for inaccuracies in the guidance of the cutter. Also provided is a spring mechanism F which is designed such that the cutter SCH can tilt out upwards if the lifting-out force exceeds an adjustable value. This cutter SCH is mounted on a mobile unit GF and is heated, for example, from a container for fuel BS via a connecting line SH. A motor M ensures that the unit GF advances above the laying channel VN on the road surface. An electric measuring device MV is used, during the process, to monitor that the microcable is not additionally damaged by the cutter SCH being introduced too deeply, the tube of the microcable MK and the metallic cutter SCH being connected to a continuity tester. If, then, the insulation layer IS is damaged by the cutter SCH, the measuring device MV responds and the depth of engagement of the cutter SCH may then be corrected. It is also possible for the exposing operation to take place in layers.

Further aids may also be provided in order to expose the microcable in the laying channel. Thus, for example, the insulation of the microcable may be designed as a type of zip fastener, so that the tube itself does not come into contact with sealing material when the latter is being introduced. After the filling material has been removed and the "zip fastener" has been opened, the microcable can be completely freely removed from the insulation. Furthermore, it is also possible for a ripping wire to be introduced into the laying channel above the microcable, it being possible for this ripping wire to be used for pulling out the filling material. If continuous cable holding-down devices have been introduced above the microcable during the laying operation, these cable holding-down devices may also be used for removing the filling material.

If the microcable has an insulation, this insulation is extremely suitable as a release means between the metallic tube of the microcable and the well-adhering filling material (for example bitumen) which seals the laying channel. A cable sheath consisting of polyethylene, paper or a swelling nonwoven acts as a zip fastener as the microcable is exposed, since those materials do not adhere to the tube but adhere well to the bitumen. Such a cable sheath thus acts as a release means between the metal tube and the filling material. The metal tube of the microcable should have a smooth surface in order to reduce the adherence. The laying channel is exposed in the abovedescribed manner, but the insulation remains in the laying channel.

Figure 48:
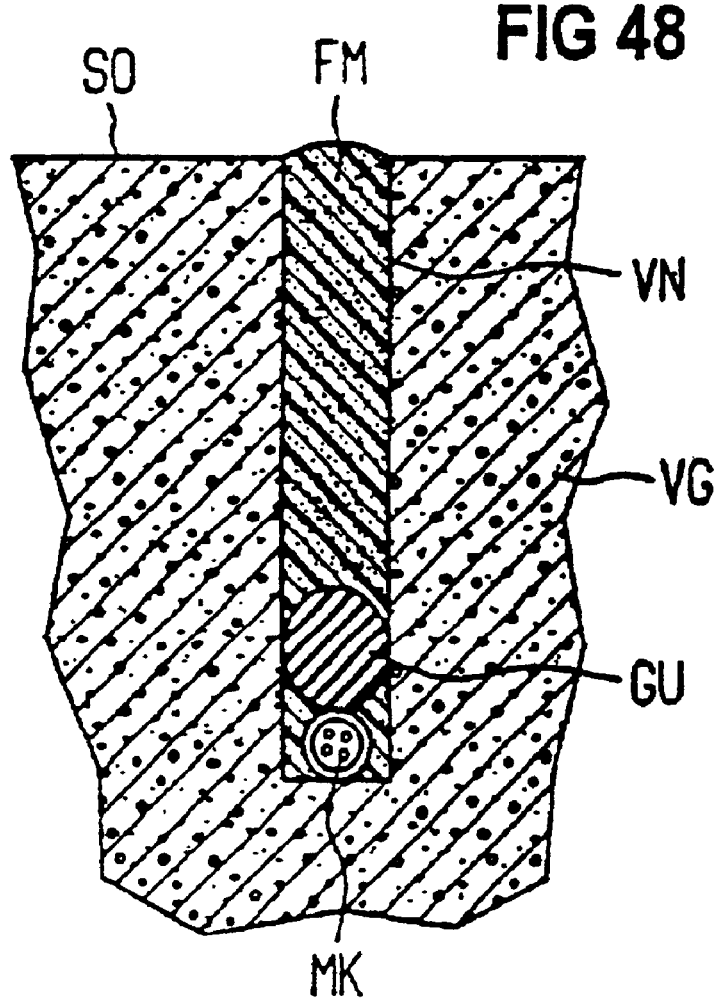
FIG. 48 shows a foam-rubber element introduced in the longitudinal direction.

It is also possible to lay a strand of foam rubber GU as release means between the microcable MK and the filling material FM, as is shown in FIG. 48. In such an arrangement, the cutter of the laying unit would then not have to be heated. It is also possible to use a particularly strong cable sheath. In addition, the cable sheath may also be thickened.

In accordance with the same process, it would also be necessary to remove a filling material from a laying channel which are introduced between the individual slabs of a concrete roadway or in expansion joints of slabs on which it is possible to drive. It would therefore also be possible to dispense with the operation of introducing an additional channel with the aid of a cutting blade in the case of concrete roads. If these channels in the concrete have a dimension which corresponds approximately to the diameter of a microcable, such cables can be introduced into these already existing channels without further measures being taken. These channels are then likewise filled with filling material and sealed. Since such seals in the channels of the concrete slabs have to be renewed at certain time intervals for safety reasons, there is the opportunity to use such occasions to lay new microcables without additional cost, time-saving also playing a role here. Moreover, the road structure would not be weakened by additional laying channels for the microcable. It would be possible for the expansion joints to be made deeper or wider by abrasive grinding.

Concrete roadways are divided up, directly after casting, by dummy joints into individual slabs of a size of from 7.5 m to 20 m. These dummy joints are predetermined breaking points which are produced by cuts of a depth of approximately 5 to 10 cm and a width of approximately 8–10 mm. Sealing strip, foam rubber or filling bitumen seal the dummy joints against dirt and surface water. Such channels are likewise suitable for the laying of microcables. In order to protect the microcables laid therein and in order to be able to compensate for irregularities caused by the soil mechanics, it is expedient to widen the dummy joint at each concrete-slab joint, so that the microcable has sufficient opportunities for compensation in these areas. For this purpose, a core hole with a diameter of 8 to 10 cm would be sufficient in order to protect the laid microcable when roadway slabs are displaced with respect to one another by subsidence, earthquakes or similar ground movement. Shearing off or buckling of the laid microcable could thus be largely ruled out.

The length of the repair set depends on the damage location. In order to have sufficient excess length of fibre, a fibre supply of approximately 1.5 m has to be allowed for each sleeve. The connecting tube VR, and thus the length of the repair set, is always 3 m longer than the defect location which is to be bridged.

The filling material can also be heated, for example, by heating current-carrying conductors which have been introduced in the filling material. The cable holding-down devices, for example, can be used for this purpose.

The object of a further development of the invention is to provide a process in which the microcable is fixed continuously along its length during the laying operation. The set object is, then, achieved, by a process of the type mentioned in the introduction, in that the microcable is fixed in a laying channel in the ground with the aid of a continuous profile body consisting of elastic material, and in that the laying channel is sealed by introducing a sealant.

The microcable, then, is fixed, in a simple manner and ideally following the laying of the microcable in the laying channel, by introducing a continuous profile body at the base of the laying channel. The continuous, elongate profile body preferably comprises an extruded, rubber-like plastic, which is usually referred to as foam rubber. The action of pressing this profile body into the laying channel deforms it elastically and, due to the elastic prestressing, wedges it against the walls of the laying channel. In so doing, irregularities are compensated for by the elastic material. The material consists of a rot-proof soft rubber which is resistant to temperature and UV. If required, this profile body may additionally be sealed at the top with a sealant, for example with hot bitumen. In this way, the profile body is additionally fixed mechanically in the channel. This gives the following advantages over holding-down devices comprising metal clamps or similar elements:

Less hot bitumen is required for the sealing.

The profile body is laid quickly, in some circumstances immediately after.

The laying operation can run continuously.

This alone provides rough sealing with respect to surface water.

The elastic material of the profile body can allow for expansions in the ground.

There is only slight shrinkage of the hot bitumen in the sealing area, so that there is hardly any "subsequent settling".

The channel filling, comprising the profile body and the sealant, can be easily removed again since a type of zip-fastener function is set up.

The main purpose of the invention, however, is to fix the microcable in the laying channel with the aid of a profile body. Furthermore, the channel is sealed towards the road surface and the cable is protected against mechanical loading and vibration.

In the simplest exemplary embodiment, use is made of an elastic profile body with circular cross-section which is pressed in directly above the microcable, for example using a roller or roll, the remaining free space in the laying channel being sealed off towards the top with a hot bitumen. On account of its elastic properties, pressing in of the profile body also fills the cavities between the microcable and the laying walls.

An exemplary embodiment in which the microcable is already sheathed with an elastic profile body is also advantageous.

However, use may also be made of dimensionally stable, elastically deformable sealing profiles, which then have deformable formations, for example barbs, which make it possible for said sealing profiles to clamp and catch on the channel walls and irregularities in the laying channel.

As sealant for sealing the laying channel against the penetration of water, use is preferably made of heats-softenable materials, for example fusible bitumen or hot bitumen or hot-melt adhesives known per se, e.g. consisting of polyamide. These sealants are introduced, under the action of heat, after the microcable has been laid in the laying channel, said laying channel then being sealed after setting of the sealants.

Use may also be made of temperature-resistant and dimensionally stable profile bodies in which there are arranged free ducts into which microcables or else free optical waveguides are drawn. The optical waveguides are introduced, then, for example by cables, fibres or fibre elements being blown or drawn in, it being possible for these operations to take place before or else after the introduction of the profile body.

It is thus possible for a microcable to be fixed in its laying channel in a simple manner by a continuous profile body, the out laying channels in the solid ground, for example a road, being closed off in a water-tight manner. The microcables can be laid better using such profile bodies and, in the event of a repair being necessary, these profile bodies can be easily removed again from the laying channel. The profile bodies which are introduced above the microcable simultaneously protect against high temperatures (from 230 to 280° C.), which may occur when the hot bitumen or the hot-melt adhesive penetrates. Moreover, it is also possible for the profile bodies to compensate, to some extent, for changes in length in the case of irregularities in the road (subsidence) or in the case of different thermal expansions of cable and road surface.

However, the microcables may also be provided during manufacture with a sheath consisting of soft, as far as possible cellular or expanded plastic, so that this sheath already assumes the function of the profile bodies. Such a microcable is then held down by the applied sheath, which is compressed in the same manner against the channel walls.

The profile bodies may thus be introduced into the laying channel as an endless profile without any joints, the profile bodies expediently being brightly coloured, so that they simultaneously provide a warning for subsequent roadworks. Moreover, the microcable is elastically sealed towards the top, so that the microcable is isolated from mechanical loading (vibration). Using a profile body which completely encloses the microcable provides a uniform radial pressure, with the result that the cable is aligned without stressing. Since the elongate profile bodies hold the microcable down uniformly, it is no longer possible for the microcable to rise up due to inherent stressing of the same. Moreover, the microcable is not subject, during laying, to any longitudinal stressing, which could possibly lead to expansion or tensile stressing of the optical fibres. During the laying operation, the microcable is routed very accurately, so that the cable cannot deflect or buckle under the thermal or mechanical loading. Furthermore, pressing the profile bodies into the laying channel results in gap-free filling of the interstices in the vicinity of the channel wall on account of their elastic properties.

The microcable may have a sheath extruded on it as early as the production stage. However, it is also possible to apply a cylindrical sheathing subsequently, shortly before the microcable is laid, said sheathing preferably being slit, so that it can be latched onto the microcable.

The introduced profile bodies can be cut out in a simple manner, during repair work, with the aid of a chisel or knife, so that the microcable which is to be repaired can be lifted in a simple manner.

It is also possible for a plurality of microcables to be arranged one above the other in one laying channel, this providing the possibility of using a profile body which has a plurality of longitudinally directed free ducts.

It is also possible for further microcables to be introduced subsequently into a laying channel, in which case the profile body is first of all removed in order to provide space for the further microcable. A profile body is then subsequently pressed in and is, once again, closed off towards the top with a sealant.

If use is made of relatively hard profile bodies, additional free ducts may run in the longitudinal direction, it being possible for fibres to be provided therein, for example blown in, at a later point in time.

Figure 49:
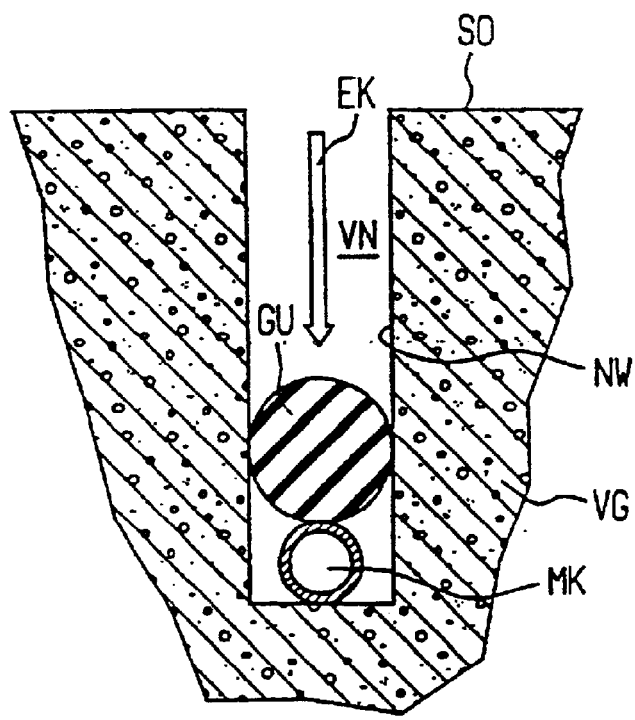
FIG. 49 shows a laying channel with a profile body of circular cross-section before the compression operation.

FIG. 49 shows a laying channel VN in solid ground VG, for example a road surface. The microcable MK has already been introduced in the base of said laying channel VN. As the arrow GK indicates, a continuous profile body GU consisting of elastic material, for example rubber, has been introduced above the microcable MK as a holding-down device for the same.

Figure 50:
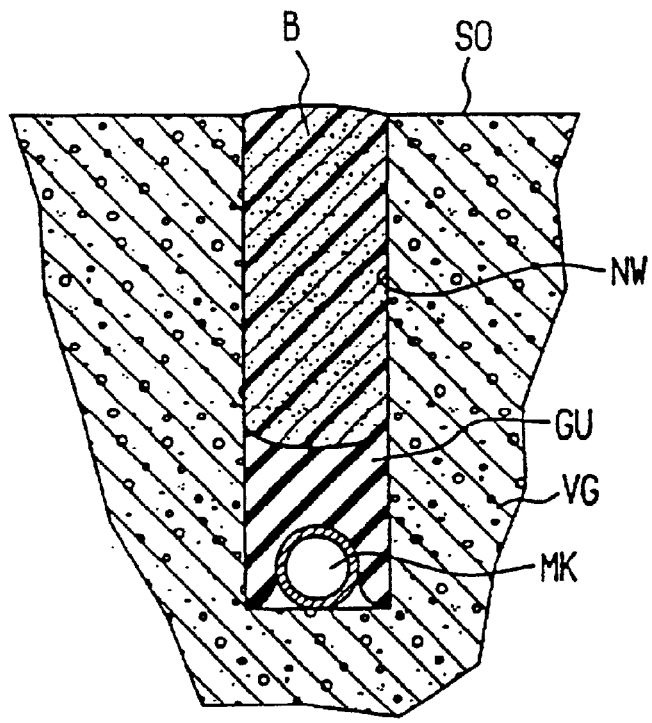
FIG. 50 shows the laying channel after it has been closed off.

FIG. 50, then, shows that the action of pressing in causes the profile body GU to mould to the microcable MK and the channel wall NW. The rest of the laying channel is filled in a sealed manner towards the top, up to the road surface SO, with a sealant B, for example a hot-melting bitumen.

Figure 51:
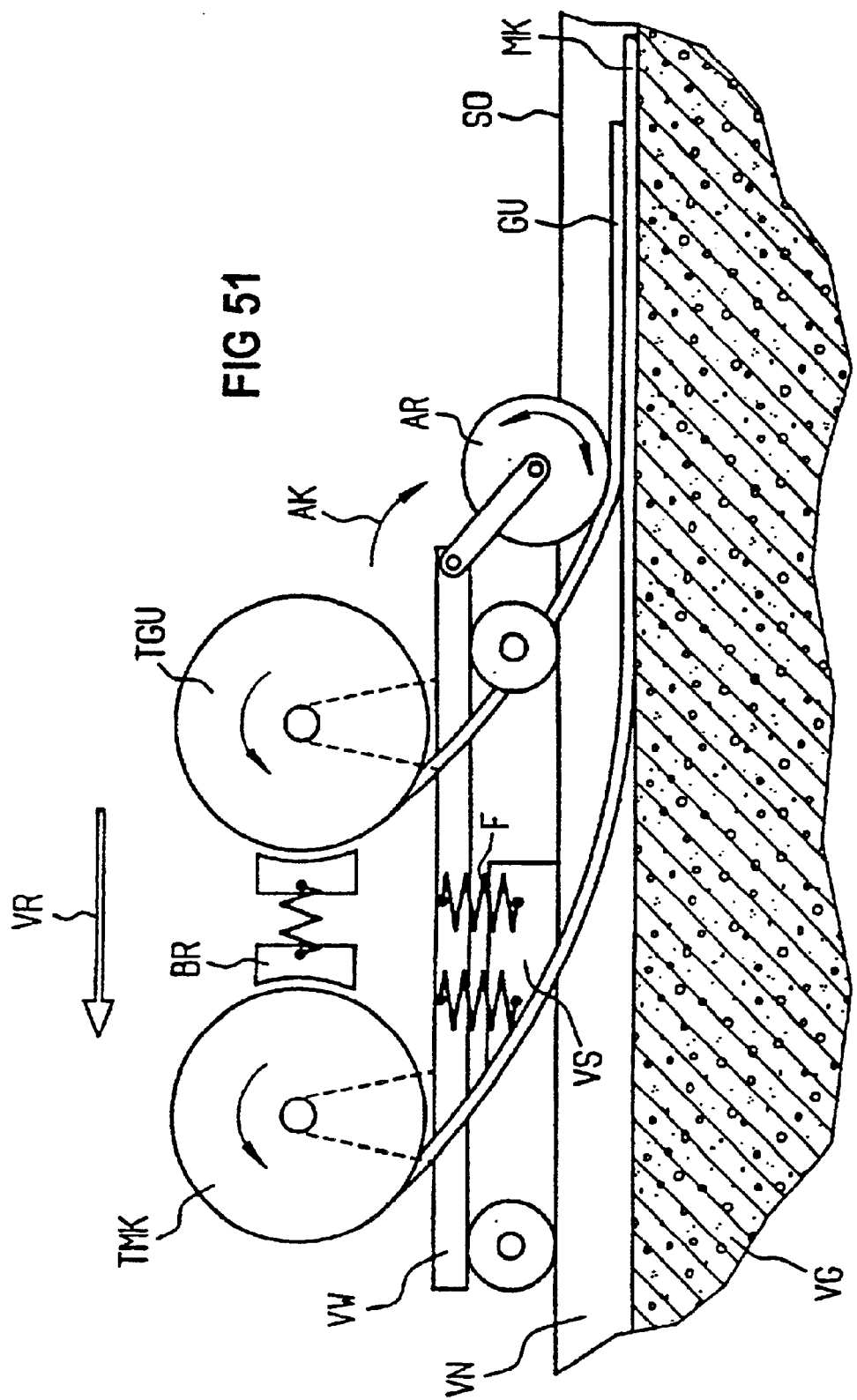
FIG. 51 shows a laying unit.

FIG. 51 shows, schematically, the operation of a laying unit VW. The microcable MK is unwound directly from a drum TMK on the left-hand side, so that the microcable can be laid easily in the laying channel. Unnecessary deformation of the microcable is avoided in this case. A laying shoe VS avoids the situation where the microcable MK rises up out of the laying channel. Provided on the right-hand side of the laying unit VW is a second drum TGU for the profile body GU which is continuously pressed into the laying channel VN above the microcable MK by a pressure-exerting roller AR. In this way, in a laying operation, the microcable MK is laid in the laying channel VN, and fixed by the profile body, in a simple manner. The laying shoe VS is held in position with the aid of a spring structure F, and a braking device BR ensures a defined drawing-off speed for the two drums TMK and TGU. Finally, the laying direction VR is indicated by an arrow.

Figure 52:
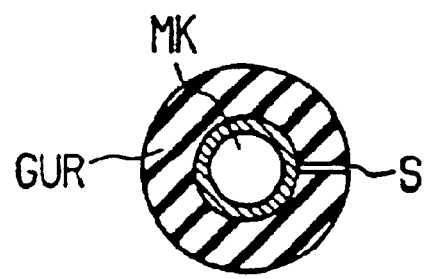
FIG. 52 shows a longitudinally slit, annular profile body which is fitted on the microcable.

FIG. 52 shows a microcable MK which has already been provided with an elongate, annular profile body GUR. This profile body can either be extruded onto the microcable MK during production or be drawn on subsequently. If the profile body GUR is drawn on subsequently, it is expedient to provide a longitudinal slit S, so that the profile body GUR can be latched onto the microcable MK by expansion. The edges of the longitudinal slit S are expediently bevelled, to render the latching-on operation easier.

Figure 53:
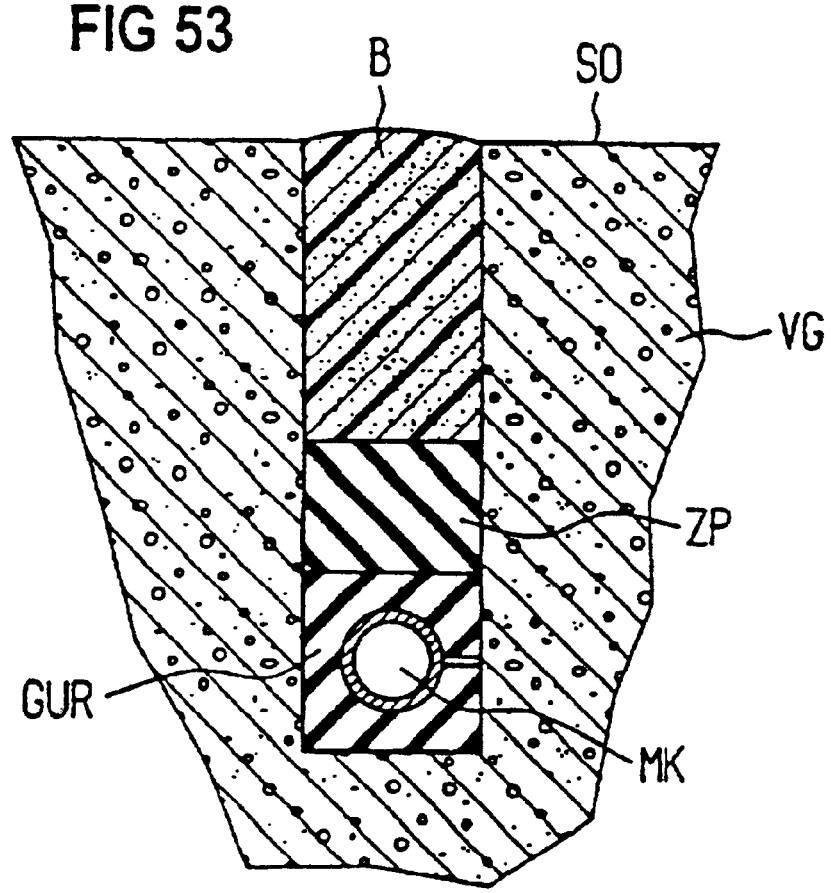
FIG. 53 shows the arrangement according to FIG. 52 after the laying channel has been filled.

FIG. 53 shows a laid microcable MK with a profile body GUR drawn thereon, the pressing-in operation deforming said profile body such that cavities are largely eliminated. In this embodiment, furthermore, an additional profile ZP which additionally closes off the laying channel towards the top is introduced. The two profile bodies consist of elastically or plastic material, so that they lend themselves well to deformation. The rest of the laying channel VG is, once again, closed off and sealed with a sealant, for example hot bitumen B. If it is intended to lift a microcable MK again, then a chisel is used to remove the sealant B mechanically and extract it from the laying channel. Since it is only the sealant and the channel wall which adhere firmly to one another, the profile body can be easily drawn out after removal of the sealant. As a result, the microcable MK which is to be repaired is freely accessible again.

Figure 54:
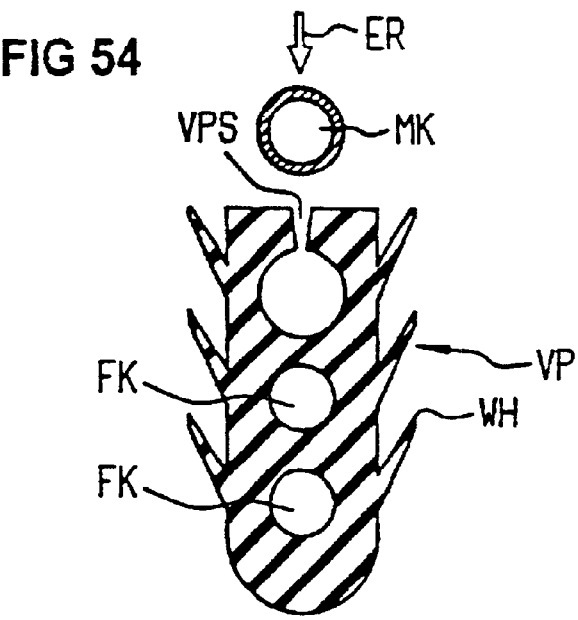
FIG. 54 shows a profile body with longitudinally running free ducts.

FIG. 54 shows the cross-section through an elongate profile body VP comprising a solid profile which has elastic properties, but cannot be deformed plastically. The profile body is fixed in the laying channel by elastic barbs WH. Arranged within the profile body VP are longitudinally running free ducts FK into which fibres can be drawn or blown at a later point in time. Provided in the upper region of the profile body VP is a duct for a microcable MK which is introduced into the profile body VP in the direction GR, through a longitudinally running slit VPS, before the laying operation.

Figure 55:
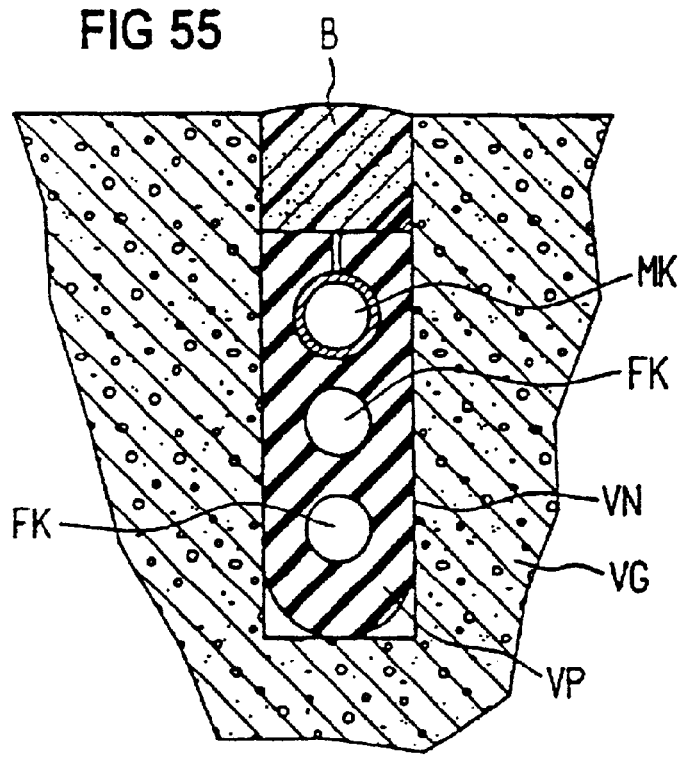
FIG. 55 shows the profile body according to FIG. 54 in the laying channel.

FIG. 55 shows the profile body VP of FIG. 54 within the laying channel VN, the elastic barbs WH having been wedged along the channel wall. Additional optical waveguides may possibly be drawn or blown into the free ducts FK of the profile body VP at a subsequent point in time. The upper part of the laying channel VN is, once again, filled with a sealant B.

FIG. 56 shows a cross-section of a profile body P which likewise has elastic properties, but cannot be deformed plastically and has already been sheathed at the factory with a fusible sealant BVP, for example consisting of hot bitumen or hot-melt adhesive. This grooved moulding NFT is heated before laying, so that it can be rolled into the laying channel in the hot state. Free ducts are, once again, provided in the profile body P, but a slit duct for receiving a microcable may also be provided here.

FIG. 57 shows the laying operation for a grooved moulding NFT according to FIG. 56. Here, use is made of a hot roll WW which presses the heated grooved moulding NFT into the laying channel VN. The sealant sheathing the profile body is expediently heated by heat radiation WS from infrared radiators IS. Before laying, the laying channel VN is also heated in order to avoid overly rapid cooling of the sealant. Finally, the excess sealant is rolled in at the road surface and removed.

Furthermore, the object of one development of the invention is to find a process in which the laid minicable or microcable is sufficiently protected against damage by the penetration of pointed implements and very sharp-edged objects. The said object is achieved according to the invention, with the aid of a process for introducing an optical cable of the type mentioned in the introduction, in that, after the introduction of the minicable or microcable into the laying channel, an elastic, notch-impact-resistant covering profile which is difficult to cut through by mechanical intervention is laid in the longitudinal direction of the minicable or microcable, and in that the width of the laying channel is covered in so doing.

The advantages of the process according to the invention for laying optical-waveguide cables, in particular minicables or microcables, consists essentially in that as early as at the actual laying stage itself additional protection is afforded for the optical-waveguide cable against accidental or intentional mechanical intrusion into the laying channel. Such intrusion in the route may occur, for example, deliberately as a result of vandalism or accidentally as a result of work being carried out in the ground there. Thus, for example, in the case of the penetration of a pointed and very sharp-edged object, for example a screwdriver or chisel, penetration as far as the microcable is prevented. This results in elastic/plastic deformation of the tough and resilient covering profile, which comprises, for example, a metal-wire core and an elastic sheathing consisting of plastic material. Intermediate coverings which run directly above the microcable may additionally be introduced during the laying operation. Wires for reinforcing the mechanical strength and sensors for information which is to be called up may additionally be introduced into these intermediate coverings. Such sensors may be used, for example, to locate and monitor disruption-free operation. The toughened resilient core essentially prevents the penetration with a sharp-edged object. The foam sheathing, on the other hand, cushions the additional loading and distributes the compressed loading over a large surface area, so that the minicable or microcable is not deformed or damaged any further. In addition, this also provides a simple lifting aid for the optical-waveguide cable, since the tensile strength of the covering profile is sufficient for removing from the laying channel the filling material which is located above said covering profile. The covering profile also serves, at the same time, as the holding-down device for the optical-waveguide cable in the laying channel and, in the case of metal inserts, can also function as an earthing strip.

FIG. 58 illustrates the cross-section of a laying channel VN, at the base of which a microcable MK is laid. An intermediate covering ZWA is additionally introduced, after or during the laying of the microcable MK, on said microcable MK located beneath it. This additionally produces buffering against mechanical action from above, with the result that directed blows with a tool or similar pointed object cannot deform or even cut through the microcable MK. Said intermediate covering ZWA may, if appropriate be provided with inserts ZWE, for example with metallic wires, or with sensors. Such sensors can be used at a later point in time to locate the cable routing as well as penetrating water or disruptions in the road structure and to trace the intrusion. With an intermediate covering ZWA consisting of conductive material, it is also possible for the tube MKR of the microcable MK to be manufactured from plastic instead of metal, it being necessary for the corresponding boundary conditions as regards tensile strength and transverse compressive strength to be observed. The covering profile AP on which the invention is primarily based is then likewise introduced above this intermediate covering ZWA after or during the introduction of the microcable. Said covering profile AP may, in principle, be designed as a metal-wire, plastic, hemp or sisal line, it being necessary for the material used to have the corresponding properties. This means that the covering profile AP has to be designed so that it is difficult to cut through, can be deformed mechanically to a limited extent and is tough and resilient, which can be achieved, for example, by stranding individual elements. However, it is advantageous if such an element is coated, as core MFK, with an elastic sheathing APU, preferably consisting of foam material, it being necessary for the diameter of the overall covering profile AP to correspond to the width of the laying channel VN, such that clamping in the laying channel is also achieved therewith. The core MFK itself has to have a thickness which corresponds at least to the diameter of the microcable, so that the covering profile AP with its core MFK provides the microcable MK with full covered protection. The rest of the laying channel VN is filled towards the top, towards the surface of the ground VG, with a filling material, preferably with hot bitumen. Such a covering profile AP thus provides considerable protection against accidental or intentional penetration of destructive objects into the laying channel VN, the tough and resilient core MFK largely preventing the penetration of a sharp-edged object. In this case, the sheathing APU consisting of elastic material cushions the loading and distributes the compressive loading over a large surface area. The microcable MK located therebeneath is not deformed or damaged. However, the intermediate covering ZWA shown in this figure does not have to form part of the arrangement if the covering profile AP meets the required conditions itself. Moreover, the mechanically strong structure of the covering profile AP may also be used as a simple lifting aid for the microcable MK since, on account of the high mechanical strength, it can be used, if required, to draw out from the laying channel VN the filling material FM located thereabove.

FIG. 59 illustrates assumed mechanical loading by a pointed object SG which is driven with a force P into the laying channel filled with the filling material FM. In this operation, the filling material FM is displaced and the object SG comes into contact with the elastic sheathing APU of the covering profile AP. In this case, the sheathing APU is deformed, or even cut through, but the pointed object SG then comes up against the core MFK, which is difficult to cut through, of the covering profile AP, where it is finally stopped. That side of the sheathing APU which in located therebeneath is deformed by the pressure produced, and a distribution of pressure takes place. The microcable MK located therebeneath, which in this case is arranged beneath the intermediate covering ZWA, is thus not damaged.

FIG. 60 illustrates the operation according to FIG. 59 in cross-section. It can clearly be seen that, when it comes into contact with the covering profile AP, the pointed object SG deforms, or else cuts through, the sheathing APU and is then prevented from advancing further by the core MFK, otherwise, the conditions correspond to FIG. 59.

What is claimed is:

1. A fiber optic cable installation structure comprising:
   a surface defining a channel having a width of about 12 mm or less;
   a cable disposed within the channel, said cable comprising a tube sized to fit within the channel and at least one optical waveguide disposed within said tube; and
   a filling material overlying said cable and at least partially filling the channel, said filling material at least partially comprised of material not previously evacuated to form the channel.

2. The fiber optic cable installation structure according to claim 1 wherein said cable has a diameter of about 10 mm or less.

3. The fiber optic cable installation structure according to claim 1 wherein said surface defines the channel to have a width of about 7 mm or less.

4. The fiber optic cable installation structure according to claim 3 wherein said cable has a diameter of about 5.5 mm or less.

5. The fiber optic cable installation structure according to claim 1 wherein the surface defines the channel to have a depth of about 15 cm or less.

6. The fiber Optic cable installation structure according to claim 1 wherein said surface comprises a solid surface selected from the group consisting of asphalt, concrete, road surface, curbstone, and stone slab.

7. The fiber optic cable installation structure according to claim 1 wherein the surface comprises a base course, a binder course disposed upon said base course and a surface course disposed upon said binder course, and wherein the surface defines the channel at least into the surface course.

8. The fiber optic cable installation structure according to claim 1 wherein said surface comprises a paved surface defining at least one expansion joint which serves as the channel.

9. The fiber optic cable installation structure according to claim 1 further comprising a release element disposed within the channel and extending lengthwise along said cable, said filling material also overlying said release element.

10. The fiber optic cable installation structure according to claim 9 wherein said release element is formed of a material selected from the group consisting of metal, plastic and foam rubber.

11. The fiber optic cable installation structure according to claim 9 wherein said release element is formed of a core surrounded by an elastic coating.

12. The fiber optic cable installation structure according to claim 11 wherein the core of said release element is at least as large as said cable.

13. The fiber optic cable installation structure according to claim 1 further comprising an intermediate covering disposed within the channel and overlying said cable, said filling material also overlying said intermediate covering.

14. The fiber optic cable installation structure according to claim 13 wherein said intermediate covering comprises at least one insert selected from the group consisting of wires and sensors.

15. The fiber optic cable installation structure according to claim 1 wherein said filling material is formed off a material selected from the group consisting of bitumen and a hot melt adhesive.

16. The fiber optic cable installation structure according to claim 1 wherein said filling material includes a marker.

17. The fiber optic cable installation structure according to claim 16 wherein the marker includes fibers selected from the group consisting of glass fibers and metal fibers.

18. The fiber optic cable installation structure according to claim 1 further comprising at least one magnet disposed within the channel, said filling material also overlying said at least one magnet.

19. The fiber optic cable installation structure according to claim 1 further comprising a device, disposed within the channel between said cable and said filling material, for holding said cable within the channel.

20. The fiber optic cable installation structure according to claim 1 further comprising a from at least partially surrounding said cable, said filling material also overlying said foam.

21. The fiber optic cable installation structure according to claim 1 further comprising a conductive cable disposed within the channel, said filling material also overlying said conductive cable.

22. A fiber optic cable installation structure comprising:
a surface defining a channel;
a cable disposed within the channel, said cable comprising a tube and at least one optical waveguide disposed within said tube;
a release element disposed within the channel and extending lengthwise along said cable; and
a filling material overlying said cable and said release element and at least partially filling the channel.

23. The fiber optic cable installation structure according to claim 22 wherein said release element is formed of a material selected from the group consisting of metal, plastic and foam rubber.

24. The fiber optic cable installation structure according to claim 22 wherein said release element is formed of a core surrounded by an elastic coating.

25. The fiber optic cable installation structure according to claim 24 wherein the core of said release element is at least as large as said cable.

26. The fiber optic cable installation structure according to claim 22 further comprising an intermediate covering disposed within the channel between said cable and said release element.

27. The fiber optic cable installation structure according to claim 26 wherein said intermediate covering comprises at least one insert selected from the group consisting of wires and sensors.

28. The fiber optic cable installation structure according to claim 22 wherein said surface defines the channel to have a width of about 12 mm or less.

29. The fiber optic cable installation structure according to claim 28 wherein said cable has a diameter of about 10 mm or less.

30. The fiber optic cable installation structure according to claim 22 wherein said surface defines the channel to have a width of about 7 mm or less.

31. The fiber optic cable installation structure according to claim 30 wherein said cable has a diameter of about 5.5 mm or less.

32. The fiber optic cable installation structure according to claim 22 wherein the surface defines the channel to have a depth of about 15 cm or less.

33. The fiber optic cable installation structure according to claim 22 wherein said surface comprises a solid surface selected from the group consisting of asphalt, concrete, road surface, curbstone, and stone slab.

34. The fiber optic cable installation structure according to claim 33 wherein the road surface comprises a base course, a binder course disposed upon said base course and a surface course disposed upon said binder course, and wherein the surface defines the channel at least into the surface course.

35. The fiber optic cable installation structure according to claim 33 wherein the marker includes fibers selected from the group consisting of glass fibers and metal fibers.

36. The fiber optic cable installation structure according to claim 22 wherein said surface comprises a paved surface defining at least one expansion joint which serves as the channel.

37. The fiber optic cable installation structure according to claim 22 wherein said filling material is formed of a material selected from the group consisting of bitumen and a hot melt adhesive.

38. The fiber optic cable installation structure according to claim 22 wherein said filling material includes a marker.

39. A fiber optic installation structure comprising:
an elongate body defining at least one lengthwise extending duct disposed within a laying channel defined by a solid surface;
at least one optical waveguide disposed within at least one lengthwise extending duct defined by said elongate body; and
a filling material overlying said elongate body and at least partially filling the laying channel.

40. The fiber optic installation structure according to claim 39 wherein said elongate body is sized to fit within the laying channel having a width of about 12 mm or less.

41. The fiber optic installation structure according to claim 39 wherein said elongate body is sized to fit within the laying channel having a width of about 7 mm or less.

42. The fiber optic installation structure according to claim 39 wherein said elongate body comprises a plurality of barbs for engaging walls that define the channel.

43. The fiber optic installation structure according to claim 39 wherein said elongate body is sheathed by said filling material.

44. The fiber optic installation structure according to claim 39 wherein said elongate body defines a slot opening into the duct.

45. The fiber optic installation structure according to claim 44 further comprising a cable inserted into the duct via the slot, said cable comprising a tube and said at least one optical waveguide disposed within said tube.

46. The fiber optic cable installation structure according to claim 39 wherein said solid surface is selected from the group consisting of asphalt, concrete, road surface, curbstone, and stone slab.

47. The fiber optic cable installation structure according to claim 39 wherein said solid surface is a paved surface.

48. The fiber optic cable installation structure according to claim 39 wherein the solid surface defines the laying channel to have a depth of about 15 cm or less.

* * * * *